US008320036B2

United States Patent
Derichs et al.

(10) Patent No.: US 8,320,036 B2
(45) Date of Patent: Nov. 27, 2012

(54) NORMALLY EMITTING PIXEL ARCHITECTURE FOR FRUSTRATED TOTAL INTERNAL REFLECTION DISPLAYS

(75) Inventors: Kevin J. Derichs, Buda, TX (US); Carey King, Austin, TX (US); Daniel K. Van Ostrand, The Woodlands, TX (US); Berry Tod Cox, Spring, TX (US); Reed J. Killion, Spring, TX (US)

(73) Assignee: Rambus Inc., Sunnyvale, CA (US)

( * ) Notice: Subject to any disclaimer, the term of this patent is extended or adjusted under 35 U.S.C. 154(b) by 547 days.

(21) Appl. No.: 12/546,601

(22) Filed: Aug. 24, 2009

(65) Prior Publication Data
US 2010/0079843 A1 Apr. 1, 2010

Related U.S. Application Data
(60) Provisional application No. 61/091,176, filed on Aug. 22, 2008.

(51) Int. Cl.
G02F 1/03 (2006.01)
G02F 1/29 (2006.01)
G02F 1/1335 (2006.01)

(52) U.S. Cl. ........ 359/259; 359/245; 359/231; 359/263; 359/315; 359/316; 359/318; 359/320; 349/62; 349/65; 345/32; 313/506; 385/15

(58) Field of Classification Search ............... 359/227, 359/230, 231, 245, 259, 263, 315, 316, 318, 359/320; 349/15, 62, 65; 385/4, 10, 15–19, 385/39; 313/110, 506; 345/32; 353/30, 353/33, 81; 382/162
See application file for complete search history.

(56) References Cited

U.S. PATENT DOCUMENTS 5,911,018 A * 6/1999 Bischel et al. .................. 385/16
5,912,997 A * 6/1999 Bischel et al. .................. 385/15
(Continued)

FOREIGN PATENT DOCUMENTS
EP 1369844 12/2003

OTHER PUBLICATIONS

Office Action with English translation issued on May 16, 2012 in Chinese Patent Application No. 200980140666.4, 10 pages (enclosed).

*Primary Examiner* — Loha Ben
(74) *Attorney, Agent, or Firm* — Renner, Otto, Boisselle & Sklar, LLP

(57) ABSTRACT

The present invention provides an apparatus that includes a waveguide and one or more pixels deployed adjacent the top surface of the waveguide which contains TIR light therein. Each pixel includes a deformable active layer having a first conductor and a driver electronics layer having a second conductor. The driver electronics layer is deployed in spaced-apart relation to the active layer and opposite the waveguide. In a quiescent state of a pixel, the active layer is in contact or near contact with the top surface of the waveguide so as to optically couple light out via FTIR (i.e., pixel's ON state). To actuate the pixel, the electronics layer is configured to selectively apply an electrical potential difference to the second conductor thereby causing the active layer to move away from the top surface so as to prevent the optical coupling of light out of the waveguide (i.e., pixel's OFF state).

28 Claims, 19 Drawing Sheets

U.S. PATENT DOCUMENTS

| | | | |
|---|---|---|---|
| 7,110,158 B2 * | 9/2006 | Miles | 359/291 |
| 7,388,706 B2 * | 6/2008 | Miles | 359/291 |
| 7,449,759 B2 * | 11/2008 | Selbrede et al. | 257/415 |
| 7,486,854 B2 * | 2/2009 | Van Ostrand et al. | 385/31 |
| 7,626,643 B2 * | 12/2009 | Ijzerman et al. | 349/15 |
| 7,671,935 B2 * | 3/2010 | Mather et al. | 349/65 |
| 7,751,663 B2 * | 7/2010 | Van Ostrand | 385/39 |
| 7,848,004 B2 * | 12/2010 | Miles | 359/291 |
| 7,855,508 B2 * | 12/2010 | Cok et al. | 313/506 |
| 7,920,226 B2 * | 4/2011 | Mather et al. | 349/62 |
| 7,948,172 B2 * | 5/2011 | Cok et al. | 313/506 |
| 2007/0172171 A1 | 7/2007 | Van Ostrand et al. | |

* cited by examiner

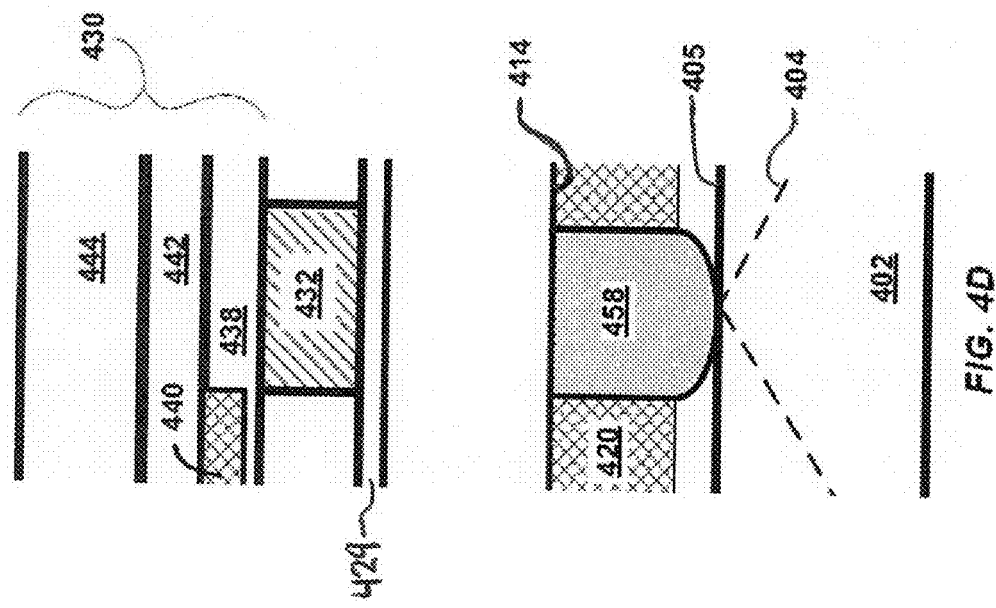
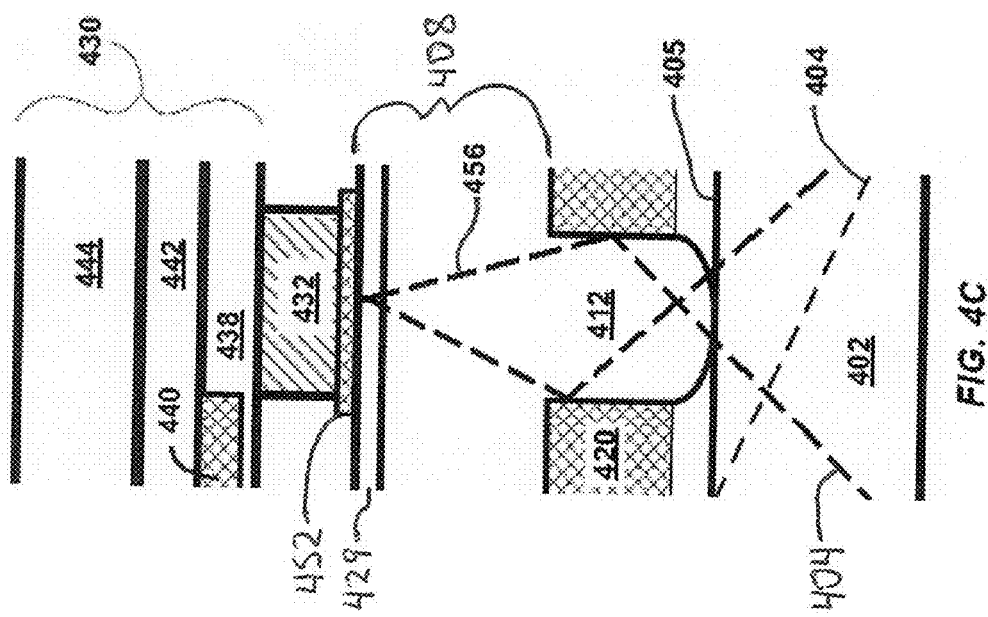
FIG. 4C
FIG. 4D

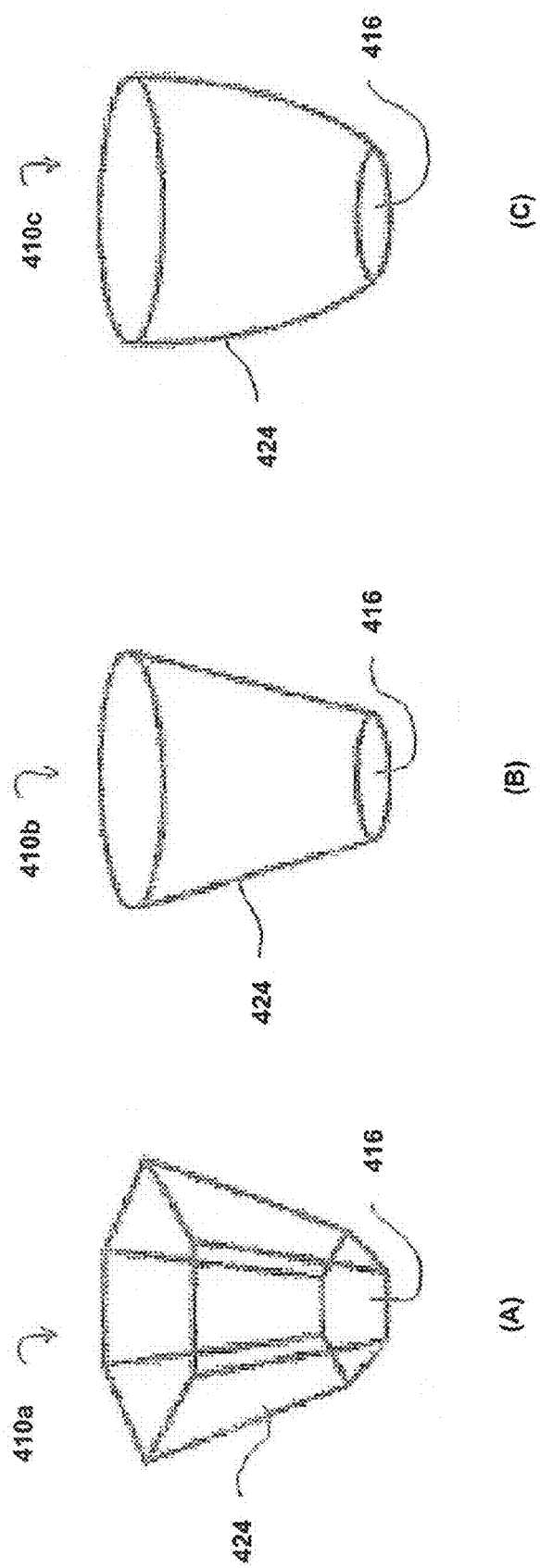

NORMALLY EMITTING PIXEL ARCHITECTURE FOR FRUSTRATED TOTAL INTERNAL REFLECTION DISPLAYS

The earlier effective filing date of U.S. Provisional Application Ser. No. 61/091,176 filed Aug. 22, 2008 is hereby claimed under 35 U.S.C. §119. This provisional application is also hereby incorporated by reference for all purposes as if set forth verbatim herein.

BACKGROUND OF THE INVENTION

1. Field of the Invention

This invention relates generally to the field of displays, and more particularly to enhancing the visual performance of transmissive displays that utilize a transparent slab waveguide to provide light to the pixel shuttering mechanisms that perform image modulation on the display surface.

2. Description of the Related Art

This section is intended to introduce the reader to various aspects of art that may be related to aspects of the present invention, which are described and/or claimed below. This discussion is believed to be helpful in providing the reader with background information to facilitate a better understanding of the present invention. Accordingly, it should be understood that these statements are to be read in this light, and not as admissions of prior art.

Most commonly used displays include an array of electro-optic elements, also referred to as an array of pixels, that generate light in response to an applied voltage or current. For example, liquid crystal displays, or "LCD displays", include an array of pixels that are formed of a molecular layer deployed between two transparent electrodes. The molecular layer lights up when a voltage is applied across the two transparent electrodes. For another example, plasma displays include an array of pixels that include an inert gas contained between glass panels. Applying electric field to the inert gas turns it into plasma that emits light. The pixel array in these displays includes equal numbers of red, green, and blue pixels that produce color images when the appropriate control signals are applied to the pixels.

An alternative to the conventional displays described above is a flat panel display that uses Frustration of Total Internal Reflection ("FTIR") to extract light traveling inside a waveguide. Typical FTIR display systems include a transparent rectangular slab waveguide that acts as a light source for an overlaying array of pixels. In operation, light (usually monochromatic light) is edge-injected into the waveguide at a selected angle such that the injected light is totally internally reflected by the surfaces of the waveguide. In some cases, the waveguide is mirrored on one or more of the side edge surfaces of the slab waveguide to increase the number of transits of the total internal reflectance ("TIR") light rays traveling within the waveguide. Light traveling within the waveguide can then be locally, selectively, and controllably extracted at each pixel location by frustrating the total internal reflection of light bound within the waveguide.

Various flat panel FTIR-based display systems have been developed over the last several decades. Among them is the Time Multiplexed Optical Shutter (TMOS) disclosed in U.S. Pat. No. 5,319,491 by Martin G. Selbrede (hereinafter referred to as "Selbrede '491"), which is incorporated by reference in its entirety herein, as well as variations disclosed in, for example, U.S. Pat. Nos. 7,092,142, 7,042,618, 7,057,790, 7,218,437, 7,486,854, and 7,450,799, which are also incorporated by reference in their entirety herein.

An example of an FTIR-based optical display, described in Selbrede '491 and other patents mentioned above, is a flat panel display that includes a plurality of pixels distributed across a planar slab waveguide. One example of such a display is depicted in FIGS. 1A and 1B. FIG. 1A is a basic cross-sectional schematic of two adjacent pixels 100, 105 of a display. A slab waveguide 130 is formed of a material having a refractive index higher than the square root of two, namely, 1.4146, and has a reflective coating (not shown) on the slab edge farthest from a light source injection edge 132. An electronics layer 112 may be disposed on a top surface 133 of the waveguide 130 to provide electronics that selectively control and actuate each of the individual pixels. Electronics layer 112 includes driver electronics, such as TFTs 114 and conductive interconnects 116 (described in more detail below), and an electronics layer pixel conductor 115, 150 at each pixel location in order to selectively actuate each pixel. The electronics layer pixel conductor 115, 150, hereinafter referred to simply as a "pixel conductor", is preferably formed from a transparent conductor material, such as indium tin oxide. An active layer 118 is supported parallel to and spaced-apart from the waveguide 130 by a plurality of spacers 110 that are positioned on a top surface 125 of the electronics layer 112. The active layer 118 may comprise a thin sheet of polymeric material 120 (e.g., an elastomer), a common conductor 122 that spans across any number of pixels disposed on a display, and a nonconductive light coupling layer 123. The sheet of polymeric material 120 is elastically deformable and preferably comprises a sheet (or film) of transparent elastomeric material that has a high refractive index selected to optimize the coupling of light when extracting light via FTIR. The common conductor 122 is preferably formed from a transparent conductor material, such as indium tin oxide. The nonconductive light coupling layer 123 may comprise, for example, a plurality of optical microstructures (e.g., a microlens array) to facilitate light extraction from the waveguide 130 and direct the extracted light towards a viewer. The plurality of spacers 110 position the active layer 118 in a spaced-apart relationship to the top surface 125 of the electronics layer 112, thereby forming a microscopic gap 135 (e.g., vacuum or gas-filled gap) therebetween. Spacers 110 are distributed across the top surface 125 of the electronics layer 112 at the periphery of the individual pixel geometries such that the active layer 118 is tethered by the spacers 110 surrounding each pixel location. In one example, the spacers 110 are formed of a square grid of aluminum disposed onto the top surface 125 of the electronics layer 112 such that each square of the grid surrounds a single pixel 100, 105 location. Thus, each pixel 100, 105 represents a discrete subsection of the display, wherein each pixel 100, 105 comprises a portion of the active layer 118 and a portion of the electronics layer 112 delineated by the spacers 110 surrounding each pixel location.

In operation, field sequential color light (e.g., sequentially illuminating primary color lights such as red, green, and blue) is edge-injected into the slab waveguide 130 and undergoes total internal reflection ("TIR") within the waveguide 130 and layer(s) (e.g., electronics layer 112) disposed thereon having a similar refractive index. The edge-injected light undergoes TIR at the interfaces of a low refractive index cladding layer formed by the air gap 135 and air surrounding a bottom surface 134 of the waveguide, thereby trapping TIR light waves 145 inside the waveguide 130 and layer(s) disposed thereon. For example, as depicted in FIG. 1A, TIR light waves 145 are constrained by the air interfaces at the top surface 125 of the electronics layer 112 and at the bottom surface 134 of the waveguide 130 due to the presence of the low refractive index air-filled gap 135 (i.e., a cladding layer) adjacent the top surface 125 and air surrounding the bottom surface 134.

FIG. 1B conceptually illustrates an OFF state and an ON state of the two pixels 100, 105, respectively, that are adjacently situated and separated by one or more spacers 110. Pixel 100 illustrates a single pixel in a non-actuated position, also referred to as an inactive state or a quiescent state. In the quiescent state, a portion of the active layer 118 between the spacers 110 associated with the pixel 100 is situated parallel to the top surface 125 of the electronics layer 112 and separated from the top surface 125 by the microscopic gap 135 such that no light is emitted at that pixel location (i.e., the pixel 100 is in an OFF state). For example, a bottom surface 140 of the active layer 118 is preferably separated from the top surface 125 by a gap height (h) (i.e., distance) greater than about 200 nanometers (e.g., a height in a range from about 200 nm to 6000 nm or greater) to insure that essentially no coupling of TIR light waves 145 from the waveguide 130 to the active layer 118 occurs across the gap 135.

Pixel 105 illustrates a single pixel in an actuated state, also referred to as an active state or an ON state position. The pixel 105 is switched to an ON state by electrically charging the pixel conductor 150, as indicated by the crosshatching of conductor 150 in FIG. 1, so as to create a sufficient potential difference and concomitant electric field between the common conductor 122 and the electronics layer pixel conductor 150 that causes the common conductor 122 and elastomer layer 120 attached thereto (i.e., the deformable active layer) to deform and move towards the electronics layer conductor 150 such that the active layer 118 moves into (or nearly into) contact with the top surface 125 of the electronics layer, thereby frustrating the TIR light within the waveguide. Thus, activation of the electronics layer conductor 150 selectively controls and actuates a portion of the active layer 118 in the area of the pixel 105 delineated by the surrounding spacers 110 by locally propelling the deformable active layer 118 across the microscopic gap 135 and into contact (or near contact) with the top surface 125 of the electronics layer 112 such that TIR light waves 145 are frustrated and emitted light waves 155 are directed out of the waveguide 130 and released from the active layer 118 at the actuated pixel location.

The electronics layer 112 typically includes driver electronics comprising thin-film transistors ("TFTs") 114 such as active matrix thin-film transistor ("AM-TFT") structures and conductive interconnects 116 such as metallic electrical traces. The driver electronics are utilized to electronically switch the individual pixels 100, 105 between ON an OFF states. For example, each pixel 100, 105 may include an AM-TFT device 114 that applies an appropriate voltage to pixel conductor 115, 150 that creates a sufficient electrical potential difference (ΔV) across the gap 135 (i.e., between the pixel conductor 115, 150 and the common conductor 122) so as to generate an electric field that causes deformation and high-speed motion of the active layer 118 towards the waveguide 130, as previously described with respect to pixel 105. To switch the pixel's state to OFF, the AM-TFT device 114 switches the voltage applied to the pixel conductor 115, 150 to a suitable voltage that sufficiently reduces the electrical potential difference (e.g., ΔV=0) between the pixel conductor 115, 150 and the common conductor 122 such that the deformed active layer 118 can elastically return to its non-deformed parallel orientation in the pixel's quiescent OFF state (previously described with respect to pixel 100).

The plurality of pixels 100, 105 in an FTIR display are electrostatically controlled micro-electro-mechanical systems ("MEMS") structures that controllably deform and propel the active layer 118 across the microscopic gap 135 into contact or near-contact with the top surface 125 of the electronics layer 112 such that light transits from the waveguide 130 to the active layer 118 either by direct contact propagation and/or by way of evanescent coupling. Each pixel 100, 105 can therefore be actuated to the ON position by propelling the active layer 118 across the microscopic gap 135 by electromechanical and/or ponderomotive deformation of the active layer 118. Application of an appropriate electrical potential across the gap 135 between the pixel conductor 115, 150 associated with the slab waveguide 135 and the common conductor 122 associated with the active layer 118 causes the deformation and high-speed motion of the active layer 118 toward the waveguide 130. Actuation is deemed completed when the active layer 118 is in physical contact (or in near contact) with the top surface 125 such that TIR light 145 can be coupled out of the waveguide 130 via FTIR. The intensity of the extracted and emitted light 155 can be controlled by either pulse width modulation (PWM) (i.e., digital grayscale) of the applied voltage or by varying the magnitude of the applied voltage (i.e., analog grayscale). Furthermore, the contact/near-contact events can occur at very high speeds in order to permit the generation of adequate gray scale levels for multiple primary colors (e.g., field sequential color light) at video frame rates and in order to avoid excessive motional and color breakup artifacts while preserving smooth video generation.

Thus, as described above, the pixel operating mode described in Selbrede '491 and the other patents mentioned above involve a pixel architecture in which the mechanically quiescent (i.e., non-actuated) position of the pixel is the pixel's OFF-state position (e.g., the quiescent pixel 100 in FIG. 1B, and both pixels as depicted in FIG. 1A), and the actuated position of the pixel is the pixel's ON-state position (e.g., the actuated pixel 105 in FIG. 1B). In the quiescent position, the pixel 100 is optically inactive because the active layer 118 is in a spaced-apart relation to the slab waveguide 130 such that light coupling (e.g., evanescent coupling) across the gap 135 is negligible. In the actuated position, the pixel 105 is optically active because electromechanical or ponderomotive deformation of the active layer 120 brings the active layer 118 physically across the gap 135 and into contact or near-contact with the slab waveguide 130 or electronics layer 112, thereby causing FTIR which allows light to be emitted from the actuated pixel region 105.

However, the imposition of the driver electronics 114, 116 and pixel conductor 115, 150 within the electronics layer 112 as disposed over the waveguide 130 can have deleterious optical effects. In particular, deploying driver electronics based on TFTs in an active matrix context (AM-TFT drive mechanisms) within the electronics layer 112 can cause light scattering and/or light intensity attenuation, illustrated as scattered light 160 and reflected light 165, respectively, that reduces the contrast ratio and/or optical efficiency of such displays. For example, optical efficiency can be compromised because AM-TFT structures generally include a series of dielectric layers composed of several different materials suited to insure proper operation of the transistors. These layers can number upwards of a dozen and each one may have a distinctly different refractive index based on the material out of which it is composed. Consequently, the particular ordering of refractive indices at specific layer thicknesses can undesirably cause some of the light entering one (or more) of the layers to be reflected back into the waveguide 130 (e.g., reflected light 165), absorbed, and/or scattered as non-TIR light (e.g., scattered light 160). The layers can cause light attenuation by reflecting much of the light (e.g., reflected light 165) back towards the waveguide, thereby preventing such light from being ejected toward the viewer during pixel actuation. In addition, the various layers of TFTs 114 and conductive interconnects 116 that may have canted surfaces with respect to the slab waveguide surface 133 and with respect to the normal (orthogonal) to that same surface, can cause undesirable scattering from such regions, thus lifting the noise floor and reducing the effective signal-to-noise ratio (and thus the contrast ratio) of the display system. Thus, certain display architectures wherein the driver electronics (e.g., interconnects, TFTs) are generally disposed on the surface of the slab waveguide 130 and/or within layer(s) disposed thereon (e.g., electronics layer 112), and thus perpetually in the path of TIR light 145 traveling inside the waveguide 130, can cause deleterious optical effects by degrading light output or inducing excess scattering that raises the system noise floor.

Another source of optical noise is light that is scattered off of spacers 110 due to the presence of an evanescent field that is generated extending from the top surface 125 when TIR light 145 travels inside the electronics layer 112 and the waveguide 130. Where the evanescent field (i.e., evanescent waves) encounters the spacers 110 resting on the top surface 125, the spacers create a discontinuous boundary condition that causes the evanescent waves to transform into a propagating wave in the visible spectrum but typically at non-TIR angles (i.e., scattered light). This causes a deleterious optical effect by lifting the noise floor and reducing the effective signal-to-noise ratio (and thus the contrast ratio) of the display system.

The disclosed subject matter is directed to addressing the effects of one or more of the problems set forth above.

SUMMARY OF THE INVENTION

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an apparatus is provided that includes a slab waveguide and one or more pixels deployed adjacent the top surface of the slab waveguide. In one embodiment, the slab waveguide is configured so that injected light is totally internally reflected at a top surface and a bottom surface of the slab waveguide. Each pixel includes a deformable active layer and a driver electronics layer. In a quiescent pixel state, the active layer is positioned adjacent and parallel to the top surface of the waveguide. The driver electronics layer is deployed in spaced-apart relationship to the active layer and opposite the slab waveguide. In a pixel's ON state, the active layer frustrates total internal reflection of the injected light when the active layer is within a first selected distance from the top surface of the slab waveguide, thereby allowing a portion of the injected light to exit the slab waveguide through said pixel. In a pixel's OFF state, the driver electronics layer is configured to apply an electrical potential difference between the electronics layer and the active layer that propels the active layer away from the top surface of the slab waveguide, thereby preventing the injected light from exiting the slab waveguide through said pixel.

BRIEF DESCRIPTION OF THE DRAWINGS

The disclosed subject matter may be understood by reference to the following description taken in conjunction with the accompanying drawings, in which like reference numerals identify like elements, and in which:

FIG. 4C schematically depicts a cutaway portion of a display surrounding a standoff to illustrate means of recycling light that enters the standoff back into the waveguide, to prevent light leakage from a perimeter of a pixel;

FIG. 4D and FIG. 4E schematically depict cutaway portions of a display surrounding a standoff to illustrate means of preventing light from exiting the slab waveguide in the vicinity of the standoff, to prevent light leakage from a perimeter of a pixel;

FIG. 5A, FIG. 5B, and FIG. 5C illustrate various geometries of exemplary embodiments of optical microstructures;

Figure 1A:
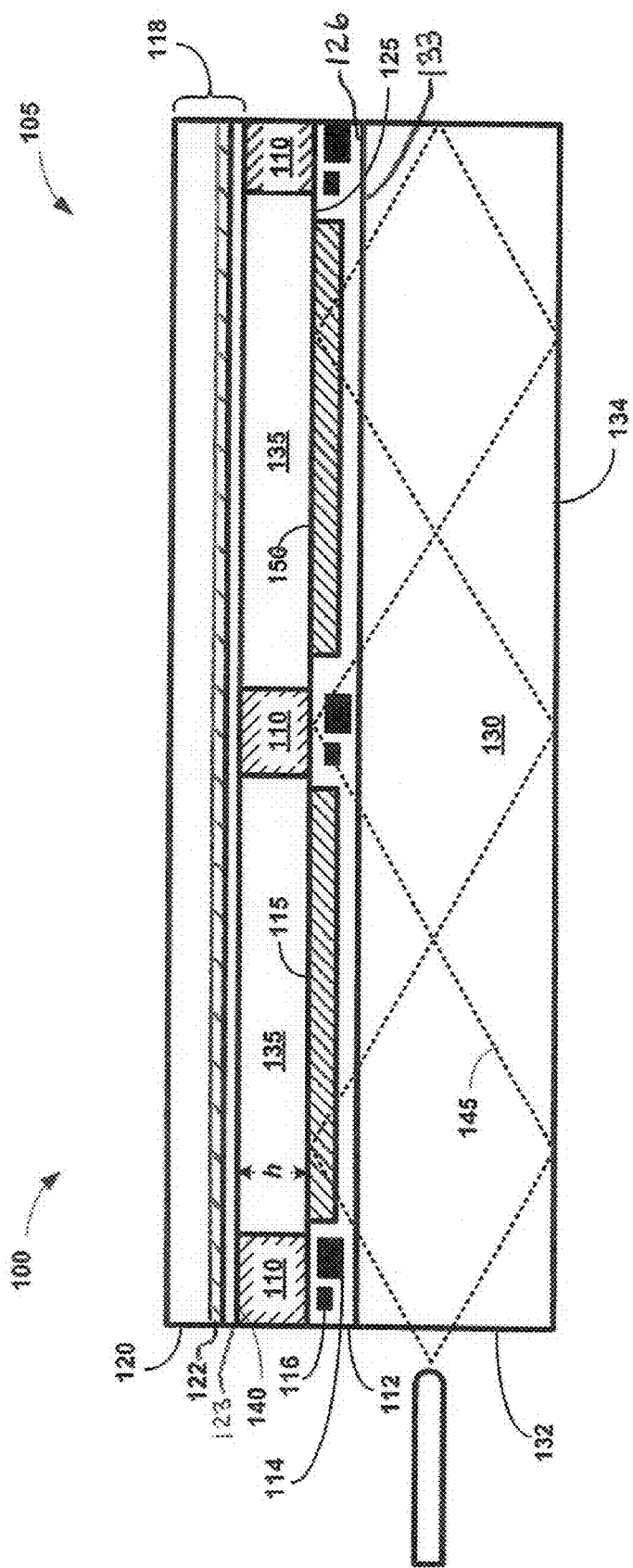
FIG. 1A and FIG. 1B conceptually illustrate two pixels that are adjacently situated and can be activated using a conventional electronics layer deployed between an active layer and a slab waveguide.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, combinations, and alternatives falling within the scope of the appended claims.

DETAILED DESCRIPTION OF SPECIFIC EMBODIMENTS

In the following description, illustrative embodiments are described to provide an understanding of the present invention. However, in the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter.

In general, embodiments of the techniques described herein provide various pixel driver architectures that enhance the optical performance (e.g., signal-to-noise ratio, luminous uniformity) of optical displays. In each of the embodiments, the mechanically quiescent (i.e., non-actuated) position of an individual pixel is where the pixel is in an "ON position" (i.e., "ON" state). The pixel's ON position refers to an optically active pixel that emits light, and preferably directs light to a viewer. Thus, the pixel is in its ON position, until such time when the pixel is actuated. To switch a pixel to an "OFF position" (i.e., "OFF" state), the pixel must be actuated to render the pixel optically inactive.

Figure 2:
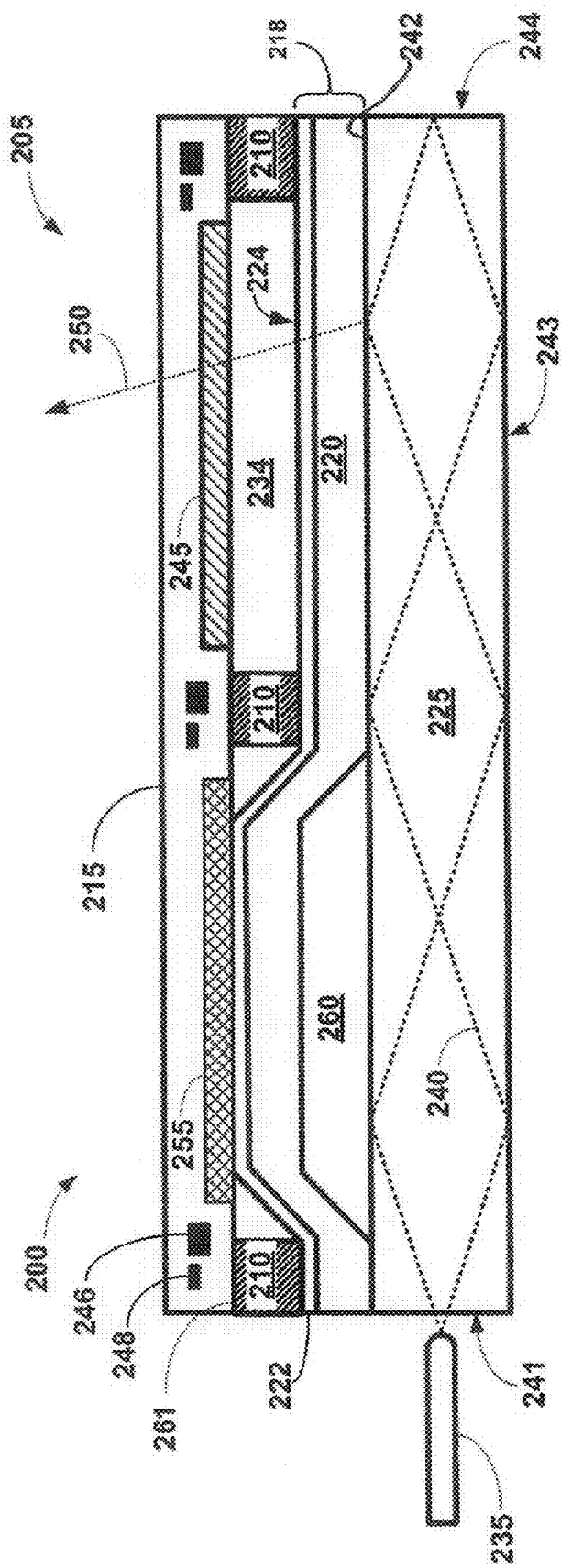
FIG. 2 conceptually illustrates two pixels that are adjacently situated and can be activated using an inverted architecture that deploys an active layer between an electronics layer and a slab waveguide, in accordance with an embodiment of the present invention.

FIG. 2 conceptually illustrates an OFF state and an ON state of two pixels 200, 205, respectively, that are adjacently situated and separated by one or more spacers 210. The pixels 200, 205 depicted in FIG. 2 implement an inverted pixel architecture that enhances the visual performance while still retaining TFT-based devices for controlling the pixels, in accordance with one embodiment of the present invention. One notable aspect of the inverted pixel architecture that enhances the visual performance is that a driver electronics layer 215 is positioned above and spaced apart from a waveguide 225 such that the driver electronics layer is not situated in the path of TIR light that travels within the waveguide 225. Furthermore, the inverted pixel architecture may advantageously require less power to actuate the pixels, as will be discussed herein.

In the inverted architecture, the pixels 200, 205 are formed by deploying a driver electronics layer 215 above and in spaced-apart relationship to an active layer 218 which is disposed adjacent the waveguide 225. The driver electronics layer 215 is supported above a top surface 224 of the active layer 218 by a plurality of spacers 210 that form a first gap 234 therebetween. The active layer 218 comprises a thin sheet of polymeric material 220 (e.g., an elastomer) and a common conductor 222 that extends over the pixels 200, 205 (or any number of pixels disposed on a display). The sheet of polymeric material 220 is elastically deformable and preferably comprises a transparent elastomeric material that has a high refractive index selected to optimize the coupling of light when extracting light via FTIR. Suitable polymeric materials include acrylates, polyethylene terephthalate ("PET"), urethanes, and other polymeric materials that exhibit elasticity. The common conductor 222 is preferably formed from a transparent conductor material, such as indium tin oxide ("ITO"). The spacers 210 are distributed across the top surface 224 of the active layer 218 at the periphery of the individual pixel geometries such that the active layer 218 is tethered by the spacers 210 surrounding each pixel location. Suitable materials to fabricate the spacers 210 include aluminum and photoresist, however it is notable that the spacers 210 may be fabricated from a wide range of transparent or non-transparent patternable materials (e.g., metals, polymers, glass, ceramics, etc.). In one example, the spacers 210 are formed of a square grid of aluminum disposed onto the top surface 224 of the active layer such that each square of the grid surrounds a single pixel 200, 205 location. The driver electronics layer 215 comprises an electronics layer pixel conductor 245, 255 at each of the pixel locations in order to selectively actuate each pixel. Each of the electronics layer pixel conductors 245, 255, hereinafter referred to simply as a "pixel conductor", preferably comprises a transparent conductor material, such as indium tin oxide. The driver electronics layer 215 may also include electronic devices 246 (e.g., TFTs) and conductive interconnects 248 (e.g., electrical traces) for selectively switching the individual pixels 200, 205 between ON and OFF states.

A light source 235 injects light into the waveguide 225 through a light injection surface 241 such that the light that enters the waveguide 225 is totally internally reflected at an upper surface 242 and a lower surface 243 of the waveguide 225, as illustrated by TIR light waves 240. As depicted in FIG. 2, the waveguide 225 may be a slab waveguide having a reflective edge surface 244 that is mirrored to reflect the injected TIR light 240 back into the waveguide 225 and increase the number of transits of the TIR light traveling therein. Note that some embodiments not shown may omit the mirrored edge surface 244. The waveguide 225 may be fabricated from any suitable waveguide materials such as optical grade glass or plastics including flexible plastics (i.e., flexible waveguide substrates). Furthermore, it is notable that the shape of the waveguide 225 may be planar (e.g., planar rectangular slab) or non-planar such as a curved waveguide substrate.

The inverted architecture differs from the conventional architecture (previously described) by allowing the active layer 218 to contact (or nearly contact) the upper surface 242 of the waveguide 225 in the quiescent state. The pixels 200, 205 are therefore in the ON or active state (i.e., optically active) when they are mechanically quiescent (i.e., non-actuated). As depicted in FIG. 2, pixel 205 illustrates a non-actuated single pixel in the ON state. The pixel conductor 245 is not electrically turned on (as indicated by the parallel-line filled box 245) in that no electric field or potential is applied to the pixel 205 sufficient to actuate the pixel, and thus the quiescent pixel 205 remains in the ON state until the pixel 205 is actuated. In the quiescent state, the portion of the active layer 218 associated with the pixel 205 is positioned close enough to the upper surface 242 to frustrate total internal reflection of the TIR light 240 that strikes the surface 242 of the waveguide 225 within the region of pixel 205. Thus, the close proximity of the active layer 218 to the upper surface 242 of the waveguide couples TIR light 240 out of the waveguide 225 via FTIR and directs it towards a viewer as emitted light 250.

Persons of ordinary skill in the art having benefit of the present disclosure will appreciate that the separation between the active layer 218 and the waveguide 225 needed to frustrate TIR light depends upon the particular materials used to fabricate the active layer 218 and/or the waveguide 225, as well as any other layers that may be formed adjacent the upper surface 242 of the waveguide. Moreover, the intensity of the emitted light 250 can be varied by varying the distance between the active layer 218 and the waveguide 225 (e.g., by varying the applied electric potential and/or electric field) or by varying the percentage of time the pixel is in the ON versus OFF state within a single video frame or sub-frame via, for example, pulse width modulation. The contact/near-contact events can occur at very high speeds in order to permit the generation of adequate gray scale levels for multiple primary colors (e.g., field sequential color light) at video frame rates and in order to avoid excessive motional and color breakup artifacts while preserving smooth video generation.

To actuate a single pixel, an applied voltage creates a potential difference between the common conductor 222 and the pixel conductor 245, 255 such that the deformable active layer 218 is pulled away from the upper surface 242 of the waveguide so as to prevent coupling of TIR light out of the waveguide 225 at the pixel's location (i.e., the pixel's OFF state). For example, pixel 200 illustrates an actuated single pixel in an OFF state. To switch pixel 200 into the OFF state, the pixel conductor 255 is electrically charged, as indicated by the crosshatching of conductor 255 in FIG. 2. Activation of a pixel's electronic device 246 (e.g., TFT) controls the voltage or charge at the pixel conductor 255, which in combination with the common conductor 222 creates a charge differential ($\Delta V$) thereby selectively actuating a portion of the active layer 218 in the area of the pixel 200 delineated by the surrounding spacers 210 by locally propelling the deformable active layer 218 away from the top surface 242 of the waveguide 225 and towards the pixel conductor 255 (i.e., driver electronics layer 215) such that a second gap 260 forms between the active layer 218 and the waveguide 225. The height of the gap 260 approximately corresponds to the height of the spacers 210 and is selected to be large enough to substantially prevent the escape or coupling of TIR light 240 from the waveguide 225 to the active layer 218 in the region of the pixel's location. It is noted that persons of ordinary skill in the art having benefit of the present disclosure should appreciate that the term "substantially" used in this context is intended to indicate that any escaping light intensity is below a selected tolerance. In particular, some acceptable amount of light may still escape from the slab waveguide 225, e.g., due to scattering and/or reflection from imperfections in the various layers, and the emission of the reconstituted evanescent waves formed by the TIR light 240 that encounters metal objects on the surface of the waveguide (e.g., mounting brackets), and the like. Those ordinarily skilled in the art will appreciate that the selected tolerance will be implementation specific depending upon factors such as desired contrast ratio, cost to achieve ultra flat and parallel surfaces of the slab waveguide 225, optical quality of the slab waveguide 225 to reduce light leakage, and the like.

Figure 1B:
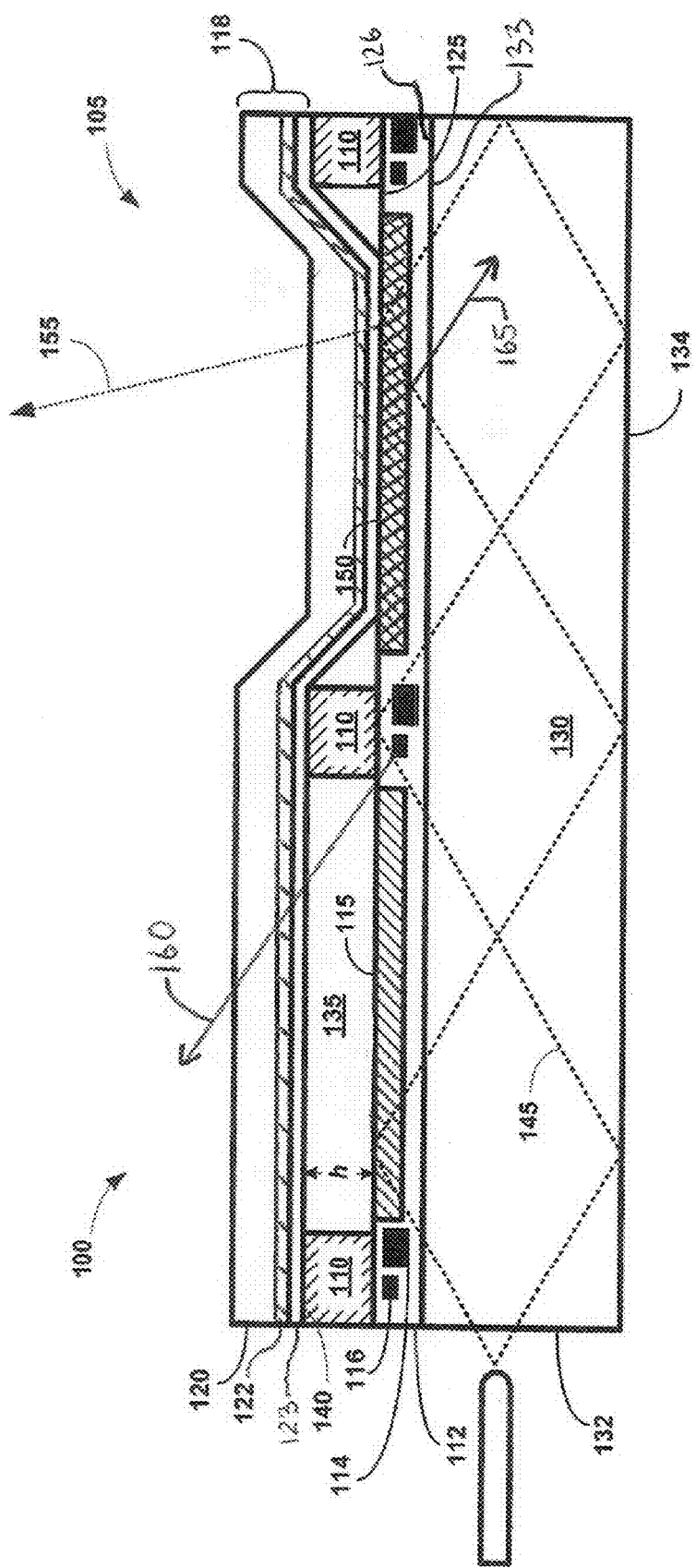

By spacing the driver electronics layer 215 away from the waveguide 225, the inverted architecture enhances the visual/optical performance of the pixel 205 by reducing light loss and light scattering associated with the conventional architecture as previously described. In one aspect, light loss and light scattering is reduced as a result of the angles at which the emitted light 250 strikes and traverses the driver electronics layer 215 thereby drastically reducing both the opportunity to encounter and interact with electronic devices 246 (e.g., TFTs) and conductive interconnects 248 therein. In particular, the emitted light 250 is incident on the driver electronics layer 215 at an angle $\Theta$ closer to the normal angle with respect to a lower surface 261 of the driver electronics layer 215. In other words, nearly all the emitted light 250 strikes and traverses the lower surface 261 at angles $\Theta$ below a critical angle $\Theta c$ (e.g., $\Theta c$ is 42 degrees for a glass-air interface), namely at non-TIR angles between $\Theta c$ and 0°, wherein the normal angle perpendicular to the lower surface 261 is equal to 0°, as schematically illustrated in FIG. 3A described below. Note that the critical angle at the boundary of any two layers is determined by the refractive index of each layer, for example the critical angle is 42° for TIR light in a glass medium with respect to an air interface. Whereas in the conventional architecture, the TIR light 145 strikes the electronics layer 112 at TIR angles that are more parallel to a lower surface 126 of the electronics layer 112, as illustrated in FIG. 1. More specifically, nearly all the TIR light 145 traveling in the waveguide 130 strikes the electronics layer 112 at angles $\Theta$ above the critical angle $\Theta c$, namely at TIR angles between $\Theta c$ and 90° (illustrated in FIG. 3A). Thus, the TIR light 145 in the slab waveguide 130 couples into the electronics layer 112 disposed thereon and is more likely to encounter electronic devices 114 and conductors 116 therein (i.e., within the TIR light path) which undesirably creates scattered and/or trapped light within the electronics layer 112 (i.e., optical noise and/or light loss). In contrast, emitted light 250 that has escaped from the waveguide 225 via the active layer 218 in the inverted architecture impinges upon the driver electronics layer 215 at angles closer to normal to the surface 261 and as such is preferentially transmitted through by more directly traversing the driver electronics layer 215 with relatively little opportunity to encounter and interact with electronic devices 246 (e.g., TFTs) and conductive interconnects 248 that cause light loss, scattering, and reflection. In addition, most of the emitted light 250 strikes the driver electronics layer 215 in areas away from the electronic devices 246 and conductive interconnects 248, which further reduces the opportunity to encounter such electronics and thereby further reduces light loss and optical noise in the optical display system.

Figure 3C:
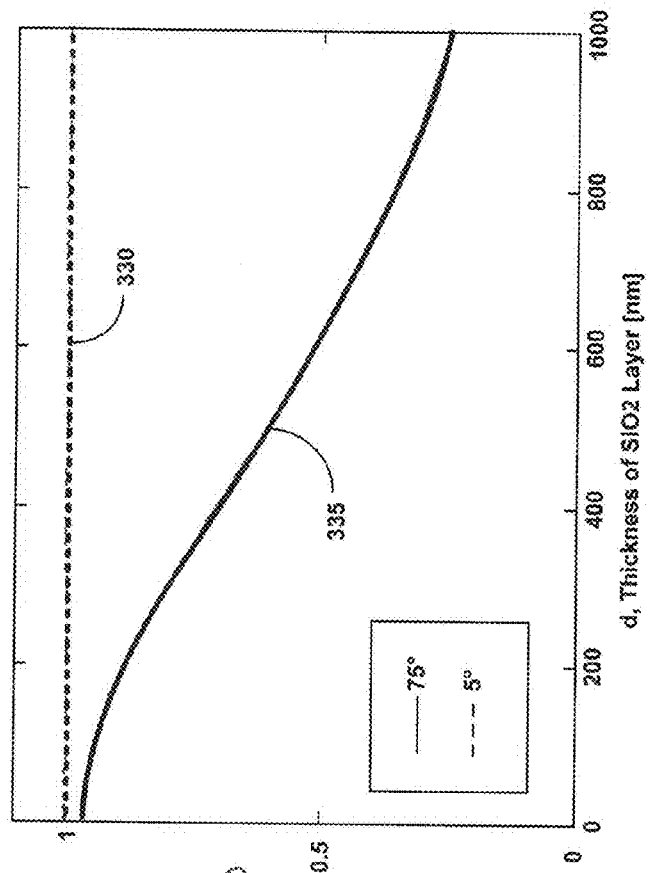
FIG. 3C shows a comparison of the transmissivity of light through the model three-layer stack depicted in FIG. 3A for two representative incident angles of light incident on the $SiO_2$ layer (i.e., an electronics layer) in a conventional pixel layer stack (e.g., 75 degrees, where 0 degrees is normal to the plane of the $SiO_2$ layer) and light incident on the $SiO_2$ layer (i.e., an electronics layer) in an inverted pixel layer stack (e.g., 5 degrees) as a function of the thickness of the $SiO_2$ layer.
Figure 3A:
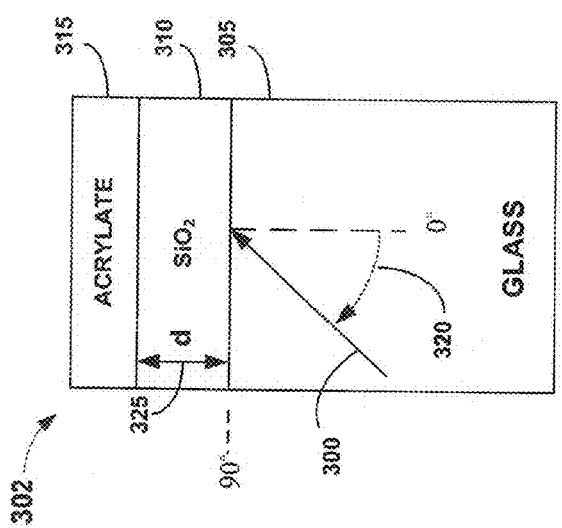
FIG. 3A conceptually illustrates light in a model three-layer stack which can represent a portion of a conventional pixel layer stack, for example, as depicted in FIGS. 1A and 1B.
Figure 3B:
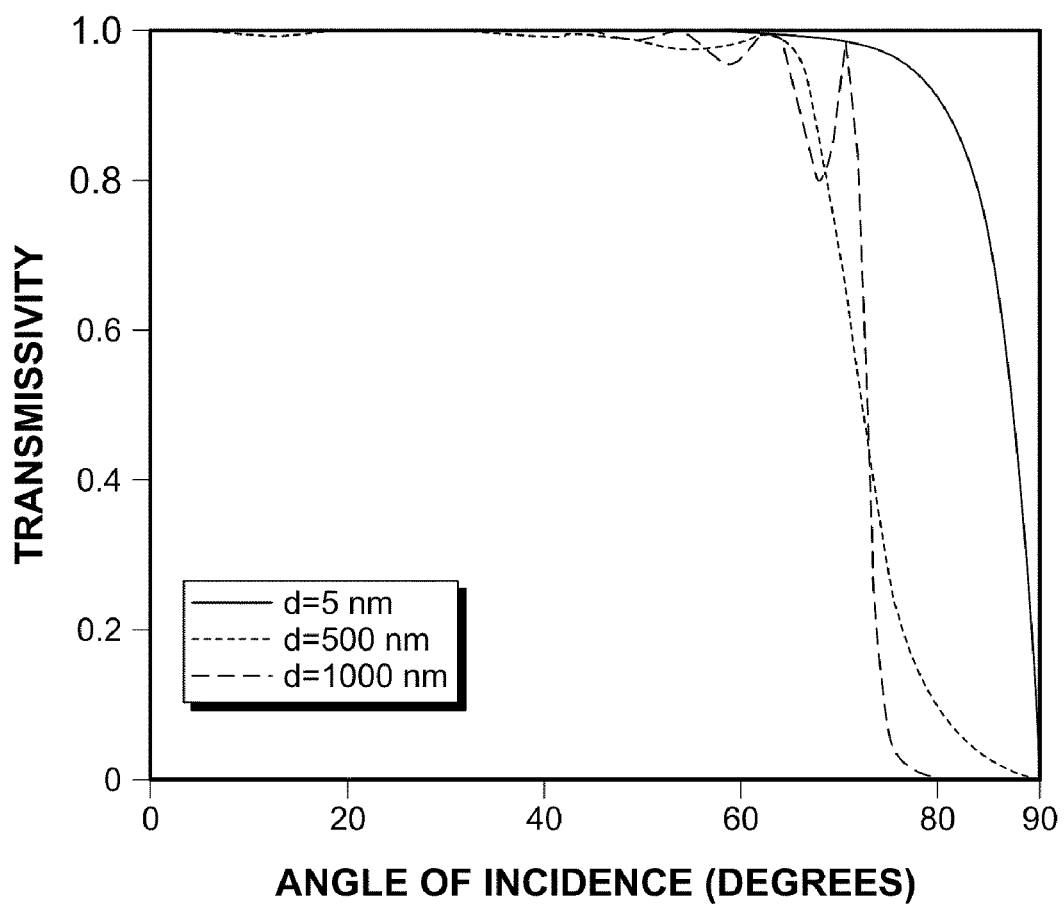
FIG. 3B shows the transmissivity of light through the model three-layer stack depicted in FIG. 3A for incident angles ranging from zero to 90° and a variable thickness (d) of the silicon dioxide ("$SiO_2$") layer.

The general concept of preferential transmittance of incident light on a layer (e.g., electronics layer) traveling at non-TIR angles versus TIR angles is illustrated in FIGS. 3A, 3B and 3C. FIG. 3A conceptually illustrates light 300 traveling in a glass layer of a model three-layer stack 302. The three-layer stack 302 includes a glass layer 305 (which has a refractive index, RI=1.52), a silicon dioxide ("$SiO_2$") layer 310 (RI=1.46), and an acrylate layer 315 (RI=1.58). For this model, the layers 305, 310, 315 are in intimate contact with each other. The three layers 305, 310, 315 were chosen because: a) glass represents the waveguide because in a FTIR display the waveguide is usually glass and the light is injected into this layer in both the conventional and inverted architectures, b) $SiO_2$ represents the electronics layer because $SiO_2$ has the lowest refractive index of the dielectric layers used in making a low temperature poly-silicon (LTPS) TFT active matrix device within the electronics layer, and c) acrylate represents the active layer because acrylate is a common material used in fabricating the active layer in a FTIR display for extracting light out of the waveguide (as described in further detail below). The three-layer stack 302 therefore provides a simple representation of light transmittance across an electronics layer 112, 215 that may be implemented in a conventional pixel layer stack, as previously illustrated by actuated pixel 105 of FIG. 1B, or an inverted pixel layer stack as illustrated by the quiescent pixel 205 of FIG. 2. Maxwell's equations are solved for the model three layer stack 302 to determine the transmissivity of light 300 (in the glass layer 305) incident on the SiO$_2$ layer as a function of incidence angle 320 and thickness 325 of the SiO$_2$ layer.

The transmissivity of light 300 incident on the SiO$_2$ layer 310 is plotted in FIG. 3B as a function of an incident angle 320 ranging from zero to 90° for three different thicknesses ("d" in nanometers) of the SiO$_2$ layer 310. With reference to FIG. 3A, light 300 having an incidence angle 320 of 0° is normal to the surface of the SiO$_2$ layer 310 and light 300 having an incidence angle 320 of 90° is parallel to that surface. For example where the critical angle for glass is 42°, with respect to a boundary layer having a RI=1.0 (e.g., air), FIG. 3B shows that there is almost no reflection (i.e., cladding) of the light traveling at angles below the critical angle. Whereas above the critical angle, where TIR occurs, the transmission of light is highly dependent on the angle of incidence 320 and the thickness 325 of the SiO$_2$ layer 310.

FIG. 3C also shows the transmissivity of light through the SiO$_2$ layer 310 for light 300 having two representative incident angles as a function of the thickness 325 of the SiO$_2$ layer 310. The dashed line 330 having an incidence angle 320 of 5 degrees is a typical angle of incidence of the light 250 that strikes the electronics layer 215 in the inverted architecture and the solid line 335 having an incidence angle 320 of 75 degrees is a typical angle of incidence of the average TIR light 145 that strikes the electronics layer 112 in the conventional architecture. FIG. 3C further demonstrates that for light having an incident angle of 5 degrees, i.e., traveling at angles below the critical angle, there is almost no reflection (i.e., cladding) of the light independent of the thickness of the SiO$_2$ layer 310 through which it travels. However, light having an incident angle of 75 degrees, i.e., traveling at angles above the critical angle where TIR occurs, the transmission of light and reflection (i.e., cladding) thereof is highly dependent on the angle of incidence 320 and the thickness 325 of the SiO$_2$ layer 310. As such, significant light loss occurs and increases with increasing thickness of the SiO$_2$ layer. The transmissivity illustrated by this model facilitates the understanding that in the inverted architecture, where the incident angles 320 of the majority of the light 250 striking the driver electronics layer 215 (or TFT array) are at non-TIR angles (e.g., angles below the critical angle 42 degrees for a glass-air interface) light reflection (i.e., cladding) is minimized and measurably negligible as well as independent of the thickness of the driver electronics layer 215 shown in FIG. 2. Whereas in the conventional architecture illustrated in FIG. 1, where the electronics layer 112 (or TFT array) is fabricated on the slab waveguide 130, all of the light (i.e., TIR light 145) within the slab waveguide 130 and incident on the electronics layer 112 is traveling at TIR angles 320 that are above the critical angle, wherein the majority of the TIR light travels at angles 320 greater than about 60 degrees. Thus, in the conventional architecture, light reflection (i.e., cladding) can be substantial and near 100% light loss (i.e., not available to extract out of the pixel) for the light having incident angles greater than about 75 degrees.

Figure 4A:
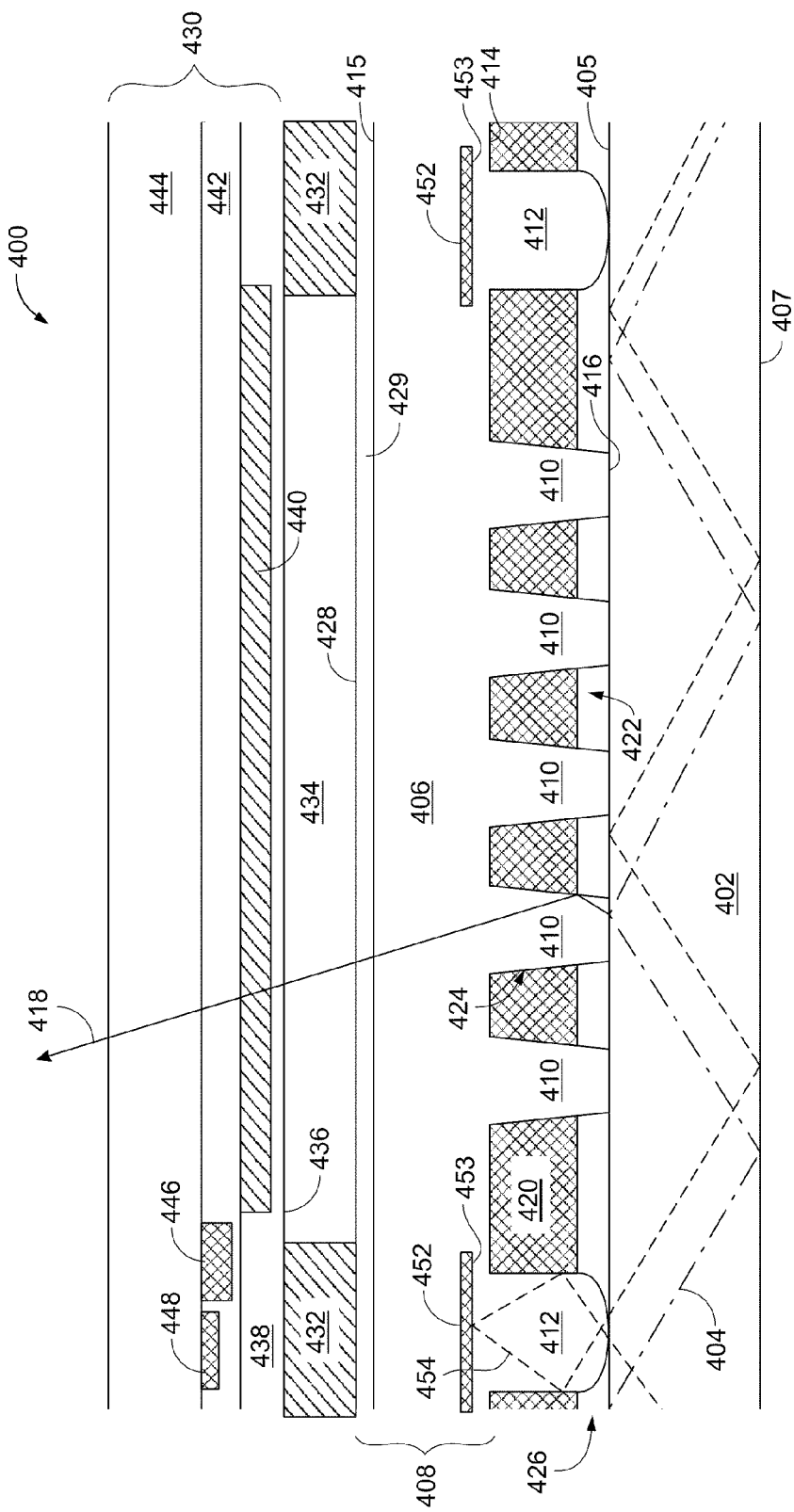
FIG. 4A and FIG. 4B conceptually illustrate a first exemplary embodiment of a pixel in the quiescent ON state and the actuated OFF state, respectively.
Figure 4B:
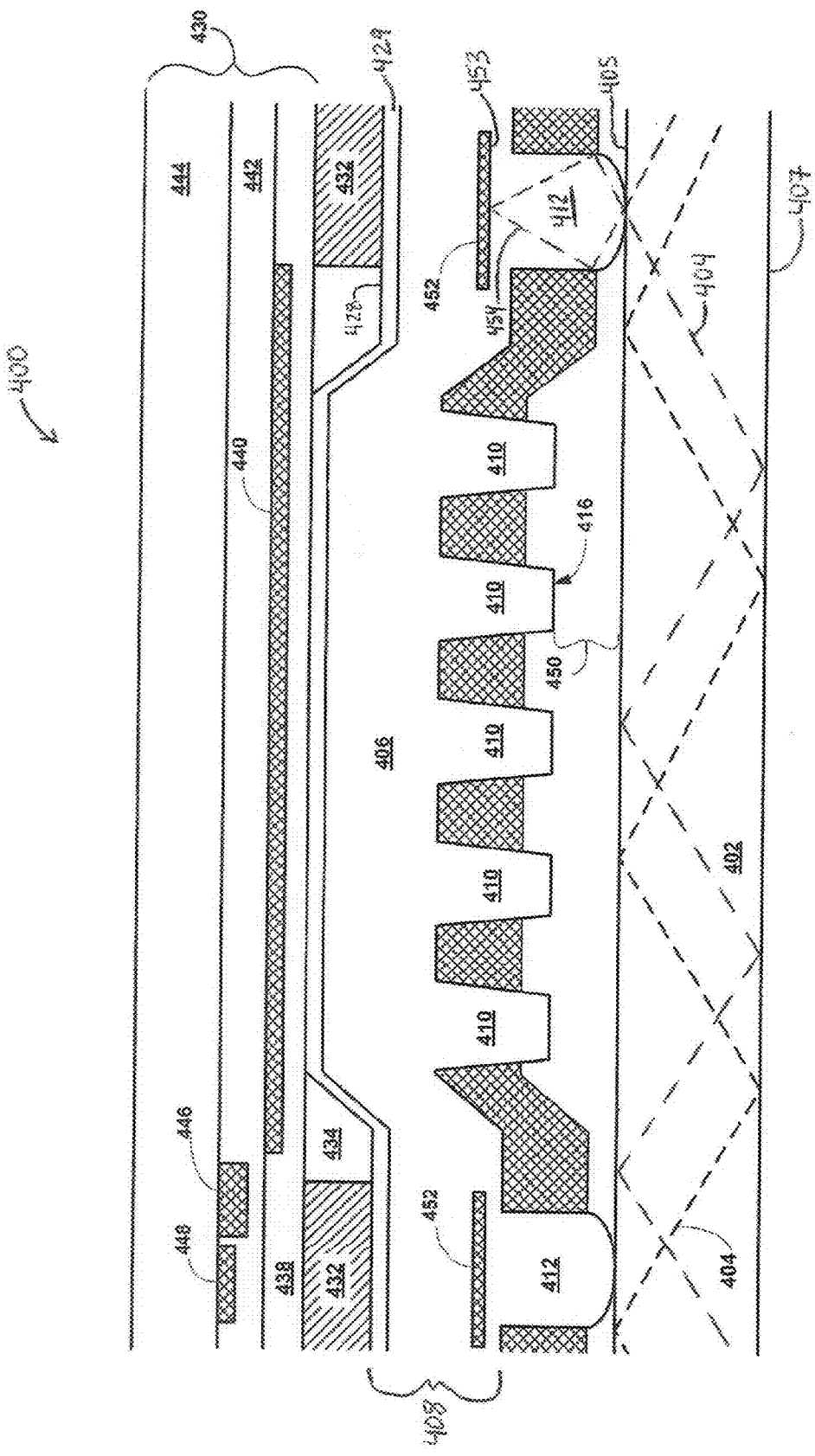

The following exemplary embodiments incorporate the description provided above with respect to the pixel architecture illustrated in FIG. 2 and further describe additional details and features of the pixel architecture in accordance with various embodiments of the present invention. FIGS. 4A and 4B conceptually illustrate a first exemplary embodiment of a pixel 400 in the quiescent ON state and the actuated OFF state, respectively. The pixel 400 includes a waveguide 402, an active layer 408, and a driver electronics layer 430 positioned in a spaced-apart relation to an upper surface 428 of the active layer 408 by a plurality of spacers 432 situated at the perimeter of the pixel 400 that form a first gap 434 therebetween, as previously described with respect to FIG. 2. The waveguide (i.e., light guide) 402 is configured to contain light that is injected into the waveguide 402 at appropriate angles (i.e., angles greater than Θc for the particular glass-air interface) such that the light is totally internally reflected at an upper surface 405, a lower surface 407, and a plurality of edge surfaces (not shown) of the waveguide 402. The waveguide 402 may be edge illuminated by a light source (not shown) adjacent one or more of the edge surfaces. For example, the waveguide 402 can be edge illuminated by light emitting diodes that inject light into one of the edge surfaces of the waveguide 402 typically referred to a light injection edge. The edge-injected light is totally internally reflected within the waveguide 402 thereby trapping TIR light 404, as illustrated by the exemplary light path of the TIR light 404. As previously mentioned, the waveguide 402 may be fabricated from transparent glass and flexible or rigid plastic materials to provide either a rigid waveguide or a flexible waveguide depending upon the particular application.

FIG. 4A depicts pixel 400 in the quiescent position (i.e., non-actuated) or ON state of the pixel wherein the pixel is optically active such that it emits light towards a viewer, as previously described with respect to FIG. 2. The active layer 408 is in contact or near-contact with the upper surface 405 of the waveguide 402 such that the active layer 408 extracts light from the waveguide 402 by frustrating the total internal reflection of the light 404 within the waveguide 402 at the location of the pixel 400. The active layer 408 comprises a flexible membrane 406 that may be made of a thin sheet of polymeric material (e.g., an elastomer) preferably having a refractive index selected to optimize the coupling of light when extracting light via FTIR. Suitable polymeric materials include optically clear or transparent polymeric materials such as PET, urethane, acrylate, and combinations thereof. The active layer 408 comprises a common conductor 429 disposed onto the upper surface 415 of the membrane 406. Note that the particular location of the common conductor 429 may be either disposed on the active layer, as presently illustrated, or within the active layer 408 preferably in close proximity to the upper surface 428 of the active layer. The common conductor 429 is an electrically conductive layer preferably made of a transparent conductive material (e.g., ITO).

The active layer 408 also includes a plurality of optical microstructures 410 (e.g., a microlenslet array) and a plurality of standoffs 412 disposed in a lower surface 414 (i.e., waveguide-facing surface) of the active layer 408. The optical microstructures 410 facilitate light extraction from the waveguide 402 and optimize viewing angle. The standoffs 412 provide for the structural integrity necessary to support the active layer 408 and delimit the geometry of the individual pixel. The optical microstructures 410 and the standoffs 412 may be formed in the lower surface 414 of the active layer 408 by essentially any suitable processing technique known to one of ordinary skill in the art. For example, the active layer 408 may be molded, thermally formed, embossed, etched or any of a number of polymer processing techniques to form the microstructures 410 and standoffs 412. A lower surface of each optical microstructure 410, referred to as an aperture 416 because light extracted from the waveguide 402 passes through this surface, contacts the top surface 405 of the waveguide 402 to frustrate the TIR light 404 within the waveguide 402 thereby locally extracting the light 404 out of the waveguide 402 as emitted light 418 and directing the emitted light 418 towards a viewer, as illustrated by the exemplary light path of emitted light 418. To further enhance optical performance, for example, by improving contrast ratio and reducing optical noise (excess unwanted light from escaping from the display surface), an opaque layer 420 (e.g. a conductive or non-conductive light absorbing material) may be disposed around the various optical microstructures to enhance brightness and attenuate optical noise, as depicted in FIG. 4A. Benefits of utilizing optical microstructures are more fully described in co-owned U.S. Pat. No. 7,486,854.

The opaque layer 420 is disposed onto the lower surface 414 of the active layer 408 and between the optical microstructures 410. The presence of the opaque layer 420 is not required for the basic operation of the display, however its presence improves the overall contrast ratio of the display. In one embodiment, light should pass primarily through or solely through the apertures 416 and an insignificant amount of light or no light should pass through the remainder of the lower surface 414 of the active layer 408. Thus, preferably, the opaque layer 420 substantially fills an interstitial area 422 between the optical microstructures 410 to help prevent light from emanating through the interstitial area 422. The opaque layer 420 may include a conformal coating (not shown) disposed in the interstitial areas 422 that extends onto a portion of a side surface(s) 424 of the optical microstructures 410 such that a spacing 426 separates the opaque layer 420 from the upper surface 405 of the waveguide 402. However it is noted that when the optional opaque layer is not present the spacing 426 separates the lower surface 414 of the active layer from the upper surface 405 of the waveguide. The spacing 426 is minimized when the apertures 416 of the optical microstructures and the upper surface 405 of the waveguide are in contact or near-contact. The opaque layer 420 is made of an opaque material that absorbs light in order to insure that the only light that traverses the active layer 408, and which is subsequently viewed by a viewer, first passes through an optical microstructure 410. The opaque layer 420 may comprise a wide variety of suitable opaque materials known in the art, for example colored materials such as black photoresist, photo-patternable black polymers, black nanofoams, and the like. Optionally, the opaque material may also be conductive, as described in FIGS. 9A, 9B, 10A, and 10B below.

The driving mechanism for the pixel 400 includes the common conductor 429 of the active layer 408 and the driver electronics layer 430 separated from the active layer by the first gap 434. When the spacers 432 are disposed directly on the common conductor 429, as depicted in FIGS. 4A and 4B, the spacers are preferably made of a nonconductive material (e.g., transparent or nontransparent photoresist) to prevent electrical charging when electrical charge is provided to the common conductor 429 during actuation of the pixel 400. In one example, spacers 432 are fabricated by depositing a photoresist material that is processed into a grid-like pattern onto a lower surface 436 of the driver electronics layer 430 such that a square of photoresist material surrounds and delimits the perimeter of each pixel location. The common conductor 429 comprises a transparent conductive material (e.g., ITO) that forms one plate of a capacitor that can be used to generate an electric field that can actuate the pixel 400.

The driver electronics layer 430 comprises an electronics layer pixel conductor 440, electronic devices 446 (e.g., TFTs) and conductive interconnects 448, as previously discussed with respect to FIG. 2. The pixel conductor 440 is also a layer of transparent conductive material (e.g., ITO) which forms the plate of the capacitor used to selectively generate the electric field that can actuate the pixel 400. The electronic devices 446 and interconnects 448 selectively provide the requisite electrical charge (i.e., electrical potential difference) to the pixel conductor 440 in order to switch the pixel 400 from an ON state to an OFF state and to switch the pixel 400 from an OFF state to an ON state, as previously discussed. In addition, as illustrated in FIGS. 4A and 4B, the driver electronics layer 430 may include a dielectric layer 438, an intermediate layer 442, and a substrate 444 that are substantially transparent to the emitted light 418. The dielectric layer 438 prevents electrical shorting and arcing between the common conductor 429 and the pixel conductor 440. The intermediate layer 442 may comprise a series of layers (not shown) typically deposited during the formation of the electronic devices 446 (e.g., TFTs formed by a series of conductors, semiconductors and dielectric layers having various refractive indices) and/or interconnects 448. Disposing the electronics 446, 448 within the driver electronics layer 430 and away from a surface of the waveguide 402 mitigates the deleterious optical effects formerly associated with their presence on a waveguide in the conventional pixel architecture.

During operation, when an electrical signal to the pixel 400 switches the pixel 400 from an ON state to an OFF state, driving or actuating the mechanically quiescent pixel (i.e., in the ON position) entails the selective application of an electrical potential difference between the conductors 429, 440 sufficient to cause the active layer 408 to locally deform and pull away from the waveguide 402 such that no FTIR occurs. In other words, the driver electronics provides an electrical potential differential between the common conductor 429 (also referred to herein as a first conductor) and the pixel conductor 440 (also referred to herein as a second conductor) when the pixel 400 is switched to an OFF state, as previously described with respect to FIG. 2. When a sufficient electrical potential difference is formed between the pixel conductor 440 and the common conductor 429, Coulomb (or electrostatic) attraction pulls at least a portion of the active layer 408 away from the upper surface 405 of the waveguide 402 a sufficient distance such that the plurality of optical microstructures 410 can no longer couple light out of the waveguide 402, as illustrated in FIG. 4B. In particular, the plurality of optical microstructures 410 are physically removed from the upper surface 405 of the waveguide 402 and repositioned in a spaced-apart relation to the upper surface 405 of the waveguide 402 thereby forming a second gap 450 therebetween, which concomitantly reduces the first gap 434.

The second gap 450 has a sufficient height (i.e., distance) between the apertures 416 of the optical microstructures 410 and the upper surface 405 of the waveguide 402 to insure that negligible coupling, or no coupling, of TIR light waves 404 occurs across the gap 450. The gap height may be greater than about 200 nm, for example, a height in a range from about 200 nm to about 6000 nm or even greater, and preferably in a range from about 500 nm to about 700 nm. Thus, actuating or driving the pixel 400 requires physically propelling at least a portion of the active layer 408 located between the surrounding standoffs 412 a sufficient distance away from the upper surface 405 of the waveguide in order to render the pixel optically inactive. The actuated pixel 400 depicted in FIG. 4B is referred to as being in it's OFF state or in an OFF position.

Furthermore, during operation, when an electrical signal to the pixel 400 switches it from the OFF state to the ON state, the electrical potential between the conductors 429, 440 is equalized, in order to release the active layer 408 such that the active layer 408 retracts to its quiescent normal ON position. Decreasing the electrical potential difference (to a value below the sufficient electrical potential difference) or completely removing the potential difference (ΔV=0) releases the potential energy (i.e., stored mechanical energy) stored in the deformed elastomeric active layer 408 depicted in FIG. 4B. This release of potential energy drives the elastomeric active layer 408 back to its normal and quiescent ON position wherein the optical microstructures 410 contact the upper surface 405 of the waveguide 402 as illustrated in FIG. 4A.

Thus, embodiments of the pixels described herein provide an inverted architecture of the FTIR-based display system wherein the driver electronics (e.g., interconnects, AM-TFTs) are disposed within the driver electronics layer 430 which is situated in a spaced-apart relation (i.e., on the other side of an air gap) to a surface of the waveguide 402. Placing layers associated with the driver electronics away from the waveguide 402, such that these layers are only in the path of light that is being emitted during pixel actuation rather than perpetually in the path of TIR light traveling inside the waveguide 402, leads to important and beneficial optical consequences (e.g., a reduction in light scattering, enhanced luminous uniformity, etc.), as described herein.

The plurality of standoffs 412 (i.e., portions of the active layer 408 tethered between the spacers 432 and the upper surface 405 of the waveguide) at the perimeter of each pixel location maintain contact with an upper surface 405 of the waveguide 402 during both actuated and non-actuated states of the pixel 400. Thus, light 404 extracted from the waveguide 402 by the standoffs 412 (i.e., via FTIR) may undesirably emit light at the perimeter of each pixel, referred to herein as "light leakage", which can produce the visual appearance of a glow. To minimize light leakage through the standoffs 412 and/or light scattering due the spacers 432, pixel 400 may optionally comprise a reflective layer 452 situated above the standoff structures 412 and below the spacers 432 at the perimeter of each pixel in order to recycle light that enters the standoff 412 (via FTIR) back into the waveguide 402. Although the particular location of the reflective layer 452 is not critical, the reflective layer 452 may be disposed onto or within the active layer 408 and vertically in-line or centered above the standoff structure 412. In FIGS. 4A and 4B, the reflective layer 452 is disposed within the flexible membrane 406 of the active layer and vertically centered over the standoff 412. TIR light 404 that enters the standoff structure 412 (from the waveguide 402) reflects off a reflective surface 453 of the reflective layer 452 and returns to an interior of the waveguide 402 as illustrated by the path of reflected light ray 454. In another example, FIG. 4C illustrates an alternate location of the optional reflective layer. FIG. 4C is a cutaway region of the pixel 400 surrounding a standoff 412. In this example, the reflective layer 452 is positioned on the active layer 408 wherein the reflective layer 452 is deposited onto the common conductor 429. TIR light 404 that enters the standoff 412 reflects off the reflective surface 453 of the reflective layer 452 and returns to an interior of the waveguide 402, as illustrated by the path of reflected light ray 456.

Figure 4F:
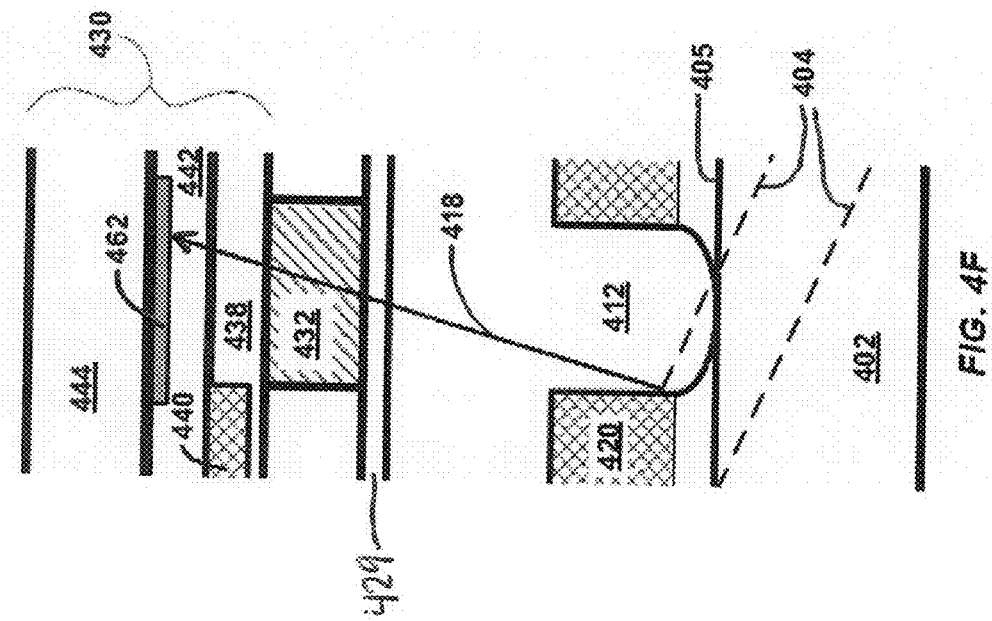
FIG. 4F schematically depicts a cutaway portion of a display surrounding a standoff to illustrate means of extinguishing light to prevent light leakage from a perimeter of a pixel.
Figure 4E:
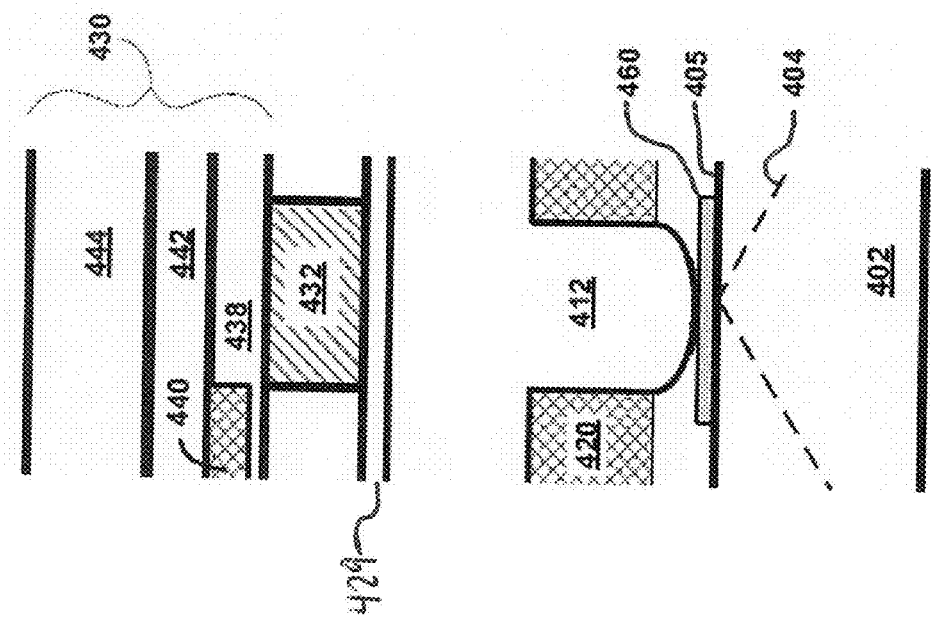

FIG. 4D and FIG. 4E illustrate alternate means to minimize light leakage through the standoffs 412 by preventing light from exiting the waveguide 402 and entering the standoffs 412 via FTIR. In one example depicted in FIG. 4D, the standoff is a cladding standoff 458 that comprises low or negative refractive index material to impart cladding properties thereto. FIG. 4D is a cutaway region of the pixel 400 surrounding the cladding standoff 458. The low or negative refractive index cladding standoff 458 may be formed on the lower surface 414 of the active layer. As such, the low or negative refractive index cladding standoff 458 that contacts the upper surface 405 of the waveguide prevents light 404 from exiting the waveguide 402 in the vicinity of the cladding standoff 458. In another example depicted in FIG. 4E, a cladding layer 460 is disposed on the upper surface 405 of the waveguide to prevent light from exiting the waveguide 402 in the vicinity of the standoff 412. The cladding layer 460 comprises a low or negative refractive index material to impart cladding properties thereto. The cladding layer 460 may be situated below the standoff structures 412 at the perimeter of each pixel in order to prevent light from entering the standoffs 412. Although the particular location of the cladding layer 460 is not critical, the cladding layer 460 may be disposed over the waveguide 402 (i.e., on the waveguide 402 or on any layers in intimate contact with the upper surface 405 of the waveguide) and vertically in-line or centered below the standoff structure 412. As illustrated in FIG. 4E, the cladding layer 460 is disposed on the upper surface 405 of the waveguide and vertically centered below the standoff 412. As such, TIR light 404 that strikes the low or negative refractive index cladding layer 460 is totally internally reflected back into the waveguide 402, thereby preventing light from entering the standoff 412.

FIG. 4F illustrates yet another alternate means to minimize light leakage through the standoffs 412 and/or through or around spacers 432 at the perimeter of each pixel. The pixel 400 may optionally comprise an absorbing layer 462 situated above the standoff structures 412 at the perimeter of each pixel in order to capture (i.e., absorb) FTIR light that passes through the standoff 412. Although the particular location of the absorbing layer 462 is not critical, the absorbing layer 462 may be disposed onto or within the active layer 408 above the standoff structure 412. Alternatively the absorbing layer 462 may be disposed above the spacer 432, for example on or within the driver electronics layer 430, when the spacer 432 is fabricated from a transparent or translucent material. The absorbing layer 462 may be vertically in-line or centered above the standoff structure 412 and/or spacer 432. As depicted in FIG. 4F, the absorbing layer 462 is disposed within the electronics layer 430 and vertically centered over the transparent spacer 432 such that an emitted light ray 418 that travels through or around the spacer structure 432 is captured and extinguished by the absorbing layer 462, as illustrated by the path of emitted light ray 418. The absorbing layer 462 comprises light absorbing material, for example one suitable material is black photoresist. It is noted that any one or more of the means illustrated in FIGS. 4A/4B, 4C, 4D, 4E, and 4F for reducing light leakage at the pixel perimeter may be employed in any of the pixel embodiments described herein. For example, the pixel embodiment depicted in FIGS. 9A and 9B (described below) deploys an absorbing layer to extinguish light that travels through the transparent spacer structure, and the pixel embodiment depicted in FIGS. 10A and 10B (described below) utilizes a low or negative refractive index layer to prevent light from entering the standoff structures.

FIG. 5A, FIG. 5B, and FIG. 5C illustrate various geometries of the optical microstructures 410. The optical microstructure 410 can have any desired geometry, such as pyramidal frustum 410a (FIG. 5A), conical frustum 410b (FIG. 5B), and compound parabolic 410c (FIG. 5C), compound elliptical, polyobject or any conic section revolved to form a solid. Preferably the optical microstructure 410 has a pyramidal frustum geometry 410a. The pyramidal frustum geometry 410a includes side surfaces 424 that are generally flat surfaces, e.g., six flat side surfaces 424 as depicted in FIG. 5A, adjacent one another and around a circumference of the optical microstructure 410. The aperture 416 (i.e., bottom surface of the pyramidal frustum optical microstructure) is a generally flat surface having a polygon geometry, e.g., a hexagonally-shaped aperture 416 as depicted in FIG. 5A, and has an orientation parallel to the upper surface 405 of the waveguide. It should be noted that the pyramidal frustum 410a is not limited to any particular number of flat surfaces and other geometries may be used (e.g., a pyramidal frustum having 3 or 4 flat side surfaces with a corresponding triangular-shaped or square-shaped aperture).

Figure 6:
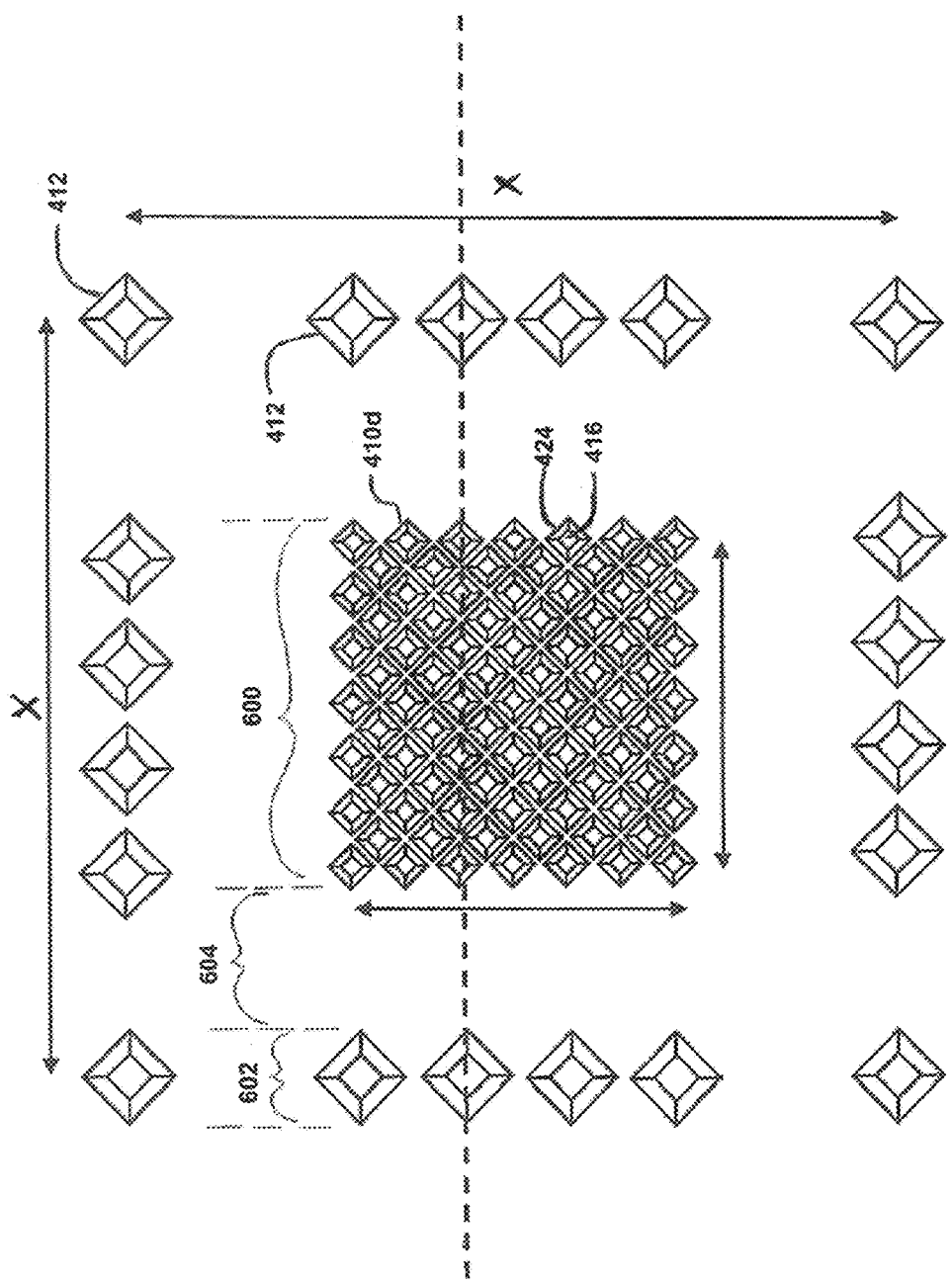
FIG. 6 schematically depicts a top view of a lower surface of an active layer to conceptually illustrate an exemplary distribution of optical microstructures for a single pixel.

FIG. 6 depicts a top view of the lower surface 414 of an exemplary active layer 408 that may be deployed in a first exemplary embodiment of a pixel 400. As depicted, the optical microstructure 410d has a shape of a pyramidal frustum 410a having four flat side surfaces 424 and a square-shaped aperture 416. The distribution of the optical microstructures 410d across the lower surface 414 of the active layer 408 may vary in order to optimize the optical performance and efficiency of the individual pixels in an optical display. For example, the optical microstructures 410d and standoffs 412 are distributed within the pixel 400 such that the optical microstructures 410d are preferably disposed in a center region 600 whereas the standoffs 412 are disposed at an outer region (i.e., perimeter) 602 of the pixel. The absence of optical microstructures 410 in a mid-region 604 of the pixel 400 ensures that no light is coupled out of the waveguide 402 when the pixel 400 is actuated to an OFF position. In other words, all of the optical microstructures 410 may be contained within the center region 600 such that when the pixel is actuated to an OFF position (e.g., FIGS. 4B and 9B), the optical microstructures 410 are of sufficient distance from the upper surface 405 of the waveguide 402 to eliminate the coupling of TIR light 404 out of the waveguide 402 via FTIR. Otherwise, in the OFF position, the presence of optical microstructures 410 within the mid-region 604 would have smaller varying distances from the upper surface 405 of the waveguide 402, and consequently any optical microstructures at an insufficient distance from the upper surface 405 would undesirably couple light out of the waveguide via FTIR through the means of evanescent coupling. Thus, it is preferable to eliminate optical microstructures 410 in the mid-region 604 of an individual pixel.

The standoffs 412 may be fabricated in a wide variety of shapes including shapes similar to any of the various optical microstructure shapes described herein. For example, the standoffs 412 depicted in FIG. 6 have the same shape as the plurality of optical microstructures 410 but are larger in size. Implementing one of the various optical microstructure shapes as the shape of the standoff 412, along with the assistance of the reflective layer 452 within the embodiment of the pixel 400 as previously described with respect to FIGS. 4A, 4B and 4C, may be advantageous to increase the likelihood that a light ray 418 that enters the standoff 412 may be re-inserted into the waveguide 402 at a TIR angle essentially equal to the angle of incidence, thereby successfully recycling TIR light. The particular shape (e.g., orientation or angle of the angled side surface of the standoff) and size of the standoffs 412 may be optimized for a given optical display. However, it is notable that the use of a cladding standoff, cladding layer, or absorber layer illustrated in FIGS. 4D, 4E, and 4F obviate the benefit of an optical microstructure-shaped standoff.

Figure 7:
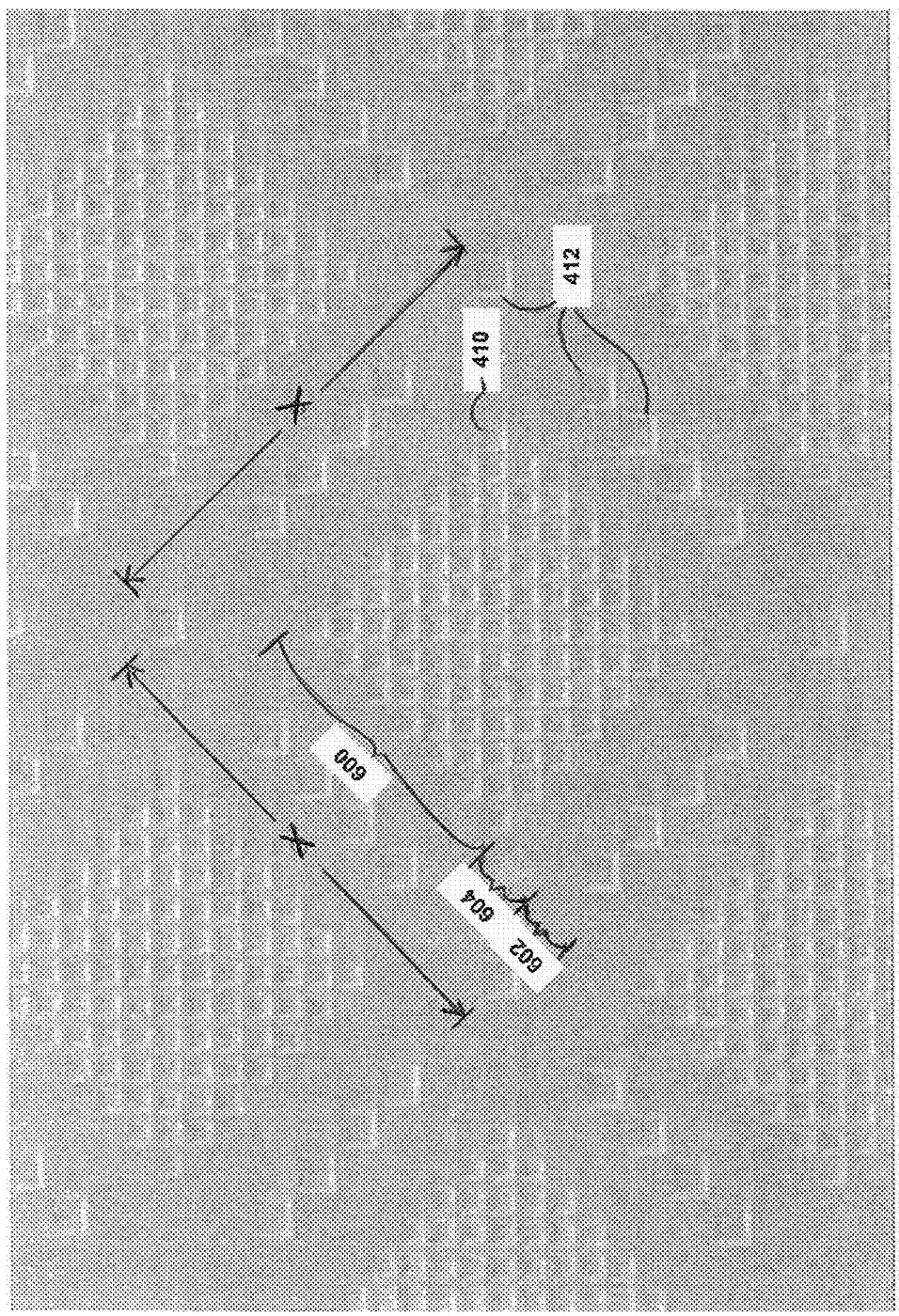
FIG. 7 is a SEM photograph illustrating the surface topography of the lower surface of the active layer illustrated in FIG. 6.

In another illustration, FIG. 7 provides a micrograph of a top view of a lower surface 414 of the active layer 408 having a distribution of optical microstructures and standoffs similar to the illustration in FIG. 6, wherein the view is rotated by about 45 degrees, and having both a width and length dimension (x) of about 250 microns for a single pixel. The active layer comprising acrylate has a plurality of optical microstructures 410 and a plurality of standoffs 412 formed on the lower surface 414 of the active layer such that the optical microstructures 410 are confined to the center region 600 and surrounded by the mid-region 604 where no optical microstructures are present. The standoff structures 412 at the perimeter of the pixel 400 are in the outer region 602 which surrounds the mid-region 604. As depicted, the standoffs 412 at the perimeter of a single pixel may be shared by adjacent pixels.

Figure 8:
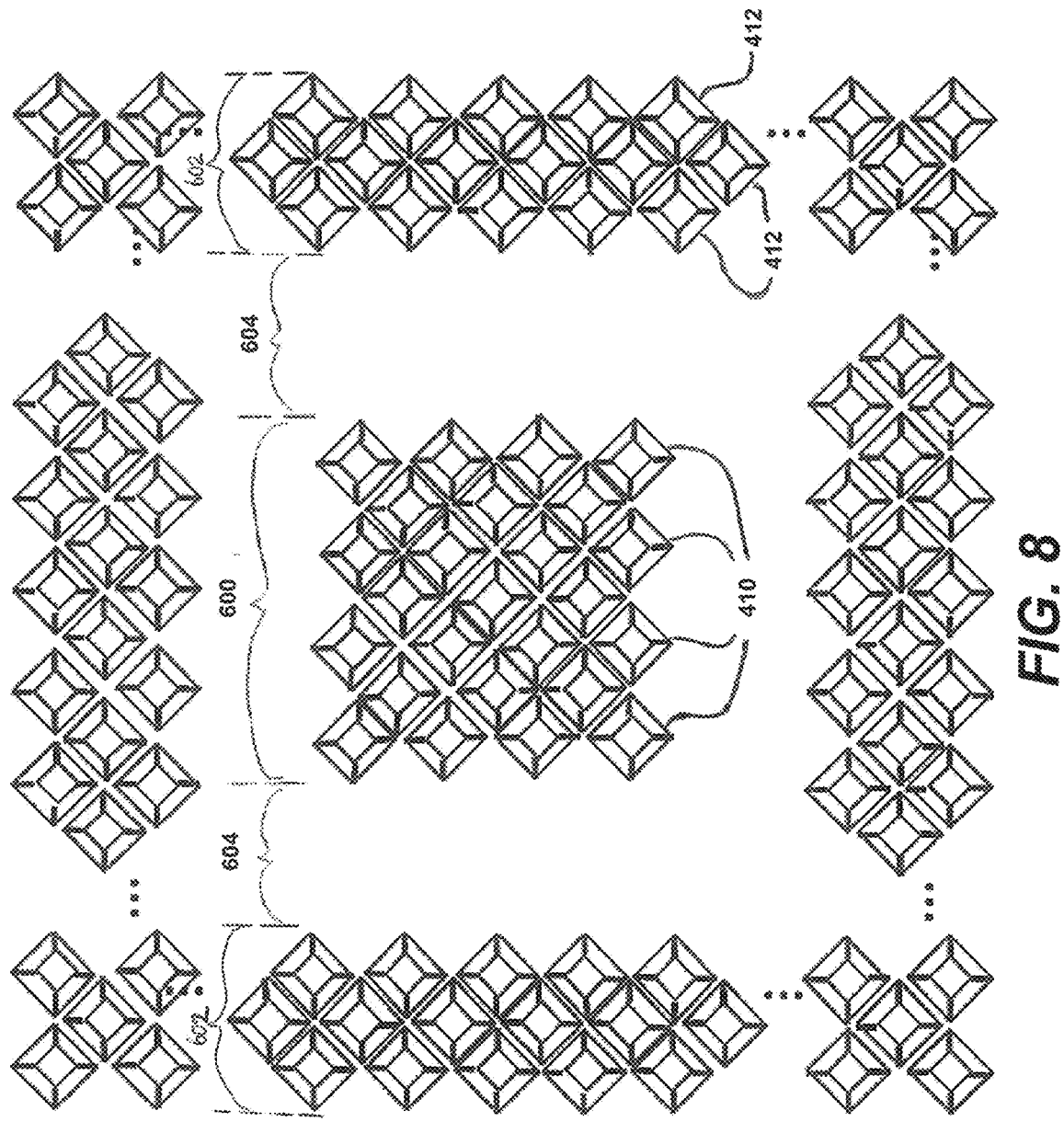
FIG. 8 schematically depicts a top view of a lower surface of an active layer to conceptually illustrate another exemplary distribution of optical microstructures for a single pixel.

FIG. 8 depicts a top view of the lower surface 414 of another exemplary active layer 408 that may be deployed in a second exemplary embodiment of a pixel 400. As illustrated, the plurality of standoffs 412 disposed in the outer region 602 of the pixel 400 (i.e., perimeter of the pixel) may also have the same size as the optical microstructures 410 disposed in the center region 600. FIG. 8 illustrates that the use of relatively small standoffs 412, for example having the same size and shape as the optical microstructures 410, may necessitate a greater number or density of the standoff structures 412 in order to provide adequate structural integrity for supporting the active layer 408 in the particular embodiment of the pixel. A benefit of the a smaller size optical microstructure-shaped standoff is that the small size of the standoff may be better adapted to direct all of the FTIR light that enters the standoff 412 (from the waveguide) into angles that are more likely to be reflected back into the waveguide at TIR angles when deployed along with a reflective layer 452 within the embodiment of a pixel 400, as previously described with respect to FIG. 6. In addition, the smaller optical microstructure-shaped standoffs typically have a smaller aperture which may reduce the amount of light that is extracted by the plurality of standoffs 412, thereby reducing optical noise within the system.

Figure 9A:
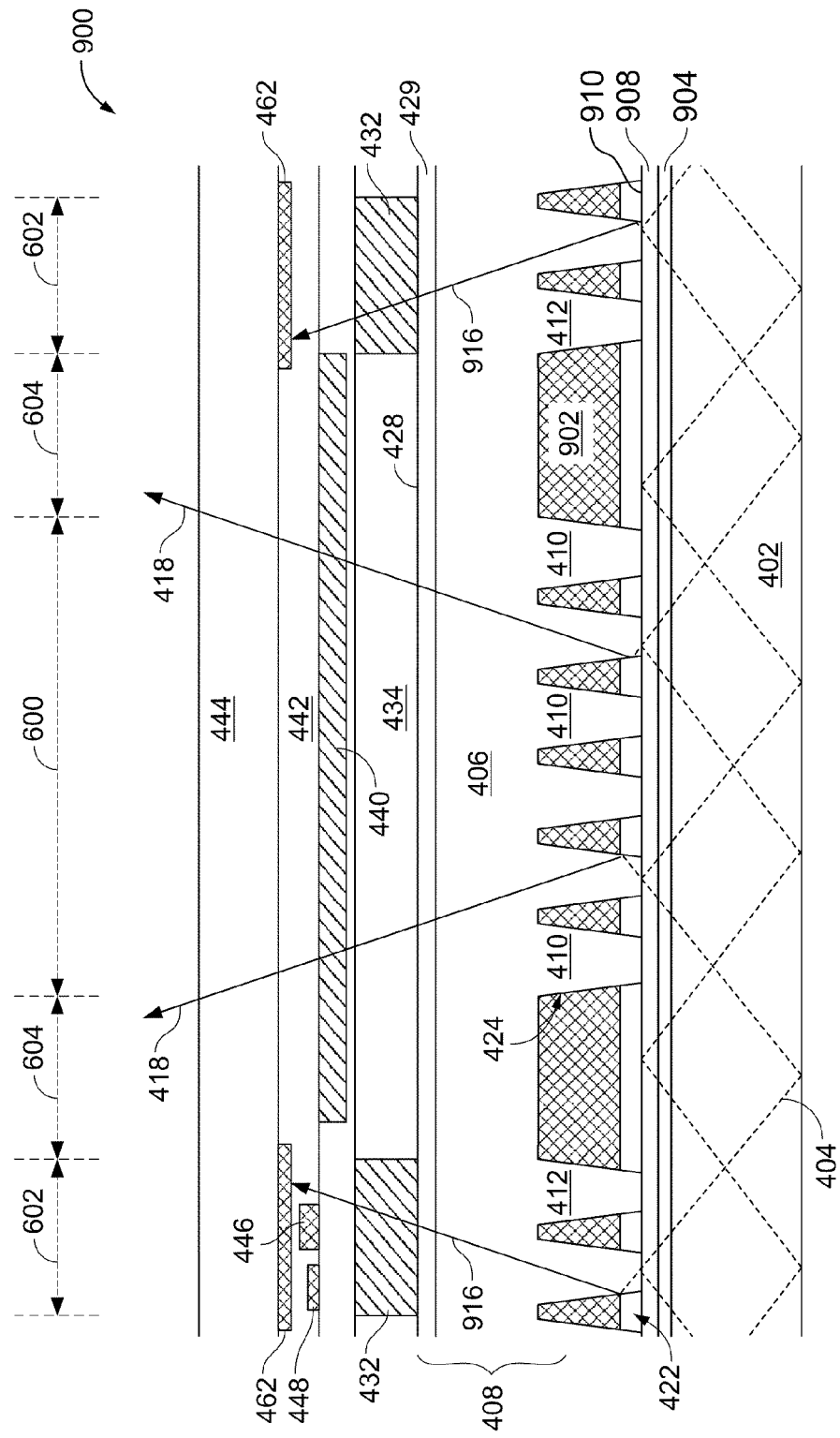
FIG. 9A and FIG. 9B conceptually illustrate a second exemplary embodiment of a pixel in the quiescent ON state and the actuated OFF state, respectively.
Figure 9B:
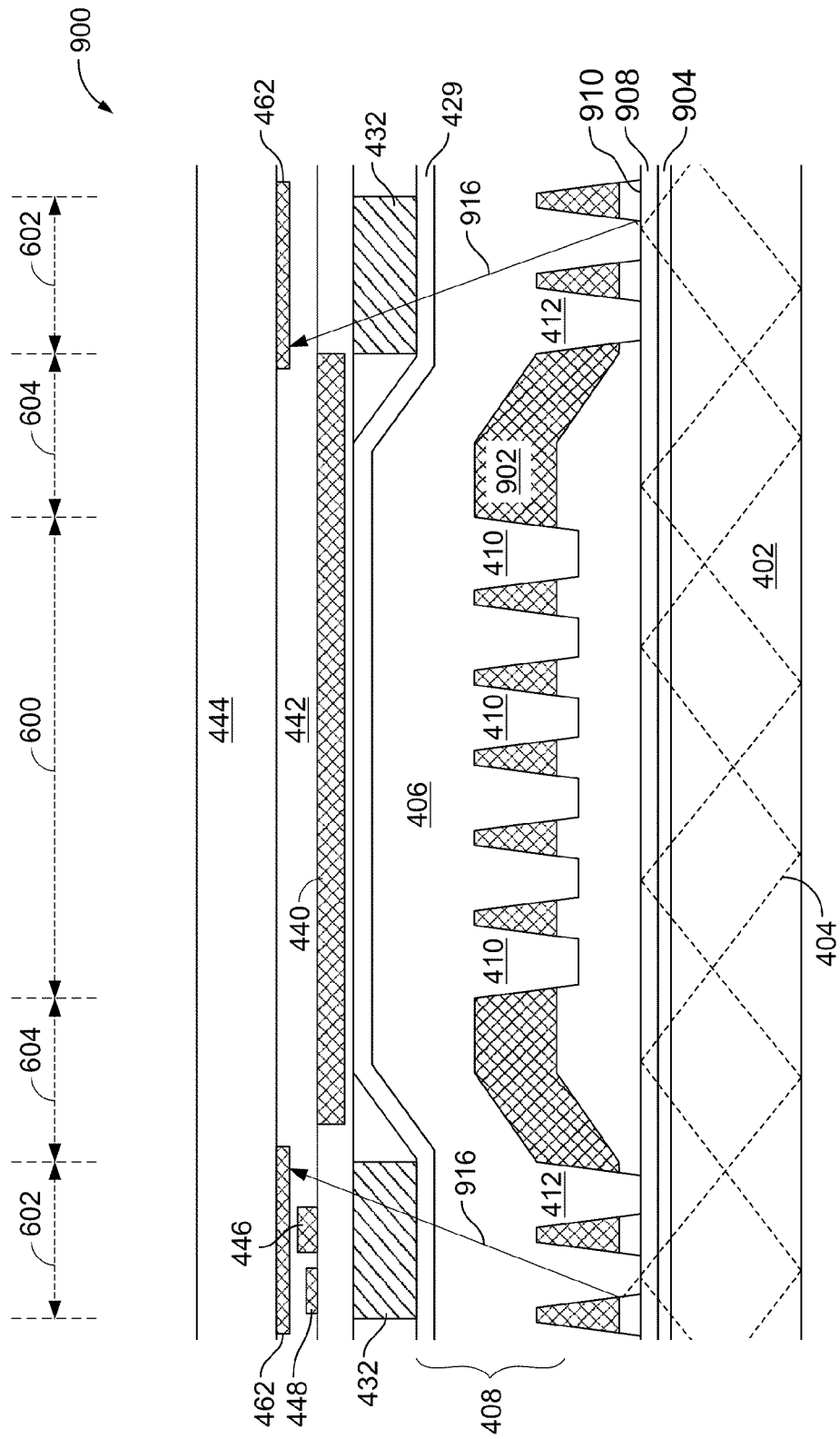

FIG. 9A and FIG. 9B conceptually illustrate a second exemplary embodiment of a pixel 900 in the quiescent ON state and the actuated OFF state, respectively. In this embodiment the pixel 900 comprises four conductors to switch the pixel 900 between ON and OFF states. This embodiment utilizes a common conductor 429, also referred to herein as a first conductor 429, and an electronics layer pixel conductor 440, also referred to herein as a second conductor 440, to actuate pixel 900 from an ON position to an OFF position, as previously described with respect to pixel 400 in FIG. 4A and FIG. 4B. However, this embodiment illustrates that a third conductor 902 and a fourth conductor 904 may be introduced into the pixel's architecture in order to assist in actuating the pixel 900 from its OFF position to its ON position. A dielectric layer 908 may be disposed over the fourth conductor 904 to prevent electrical shorting and arcing between the third and fourth conductors 902, 904 when actuating the pixel 900 back to its quiescent ON position.

The third conductor 902 is disposed onto the lower surface 414 of the active layer 408. The third conductor 902 may comprise a wide variety of transparent or non-transparent conductive materials such as ITO, copper, etc. Optionally, the third conductor 902 may also have light absorbing properties in order to enhance the contrast ratio of a display when disposed in the interstitial area 422 between the optical microstructures 410 as previously described with respect to the opaque layer 420 illustrated in FIGS. 4A and 4B. The fourth conductor 904 is disposed onto an upper surface 405 of the waveguide 402. The fourth conductor 904 is a conductive layer preferably formed from a transparent conductor material, such as ITO. The dielectric layer 908 disposed on the fourth conductor 904 is preferably comprises a dielectric material having an index of refraction similar to the index of refraction of the waveguide 402.

In the illustrated example depicted in FIGS. 9A and 9B, the third conductor 902 is a conductive opaque layer made of material(s) that has both conductive and light absorbing properties. Suitable conductive opaque materials include, but are not limited to, metallization layers, copper clad nanofoams, and multilayer conductive composites. As an opaque conductor, the third conductor 902 is disposed such that it substantially fills an interstitial area 422 between the optical microstructures 410 to help prevent light from emanating through the interstitial area 422. The third conductor 902 may include a conformal coating (not shown) disposed in the interstitial areas 422 that extends onto a portion of a side surface(s) 424 of the optical microstructures 410 such that a spacing 426 separates the opaque layer 902 from the upper surface 910 of the waveguide 402 and any layers disposed thereon (e.g., dielectric layer 908). As such, the presence of the third conductor 902 comprising a light absorbing material insures that the only light that traverses the active layer 408, and which is subsequently viewed by a viewer, first passes through an optical microstructure 410.

The third and fourth conductors 902, 904 provide an added benefit of electrically driving the active layer 408 from its OFF position to its quiescent ON position to decrease the time it takes to actuate the pixel 900 from an OFF to an ON position, thereby enhancing the overall pixel speed. During operation, when an electrical signal to the pixel 900 switches the pixel 900 from the OFF state to an ON state, an electrical potential difference may be selectively applied across the third and fourth conductors 902, 904 to drive the elastomeric active layer 408 back to its quiescent ON position. The potential difference applied across the third and fourth conductors 902, 904 generates an electric field (Coulomb attraction) that causes the third conductor 902 and the flexible membrane 406 attached thereto (i.e., the active layer) to physically move (i.e., propel) towards the fourth conductor 904 thereby assisting the active layer 408 to move into (or nearly into) contact with the top surface 910 of the dielectric layer 908 as depicted in FIG. 9A.

Thus, during operation, when a pixel 900 is switch from its OFF state to its ON state, two forces operate to return the active layer 408 to its quiescent ON position. The first force, previously described with respect to FIG. 4B, operates when the electrical potential difference ($\Delta V_1$) between the second conductor 440 and the first conductor 429 is equalized (i.e., $\Delta V_1 = 0$) (or decreases below the sufficient electrical potential difference necessary to hold the active layer 408 in the OFF state) in order to release the active layer 408 such that the active layer 408 retracts due to the release of potential energy (i.e., stored mechanical energy) stored in the deformed elastomeric active layer 408 depicted in FIG. 9B. This release of potential energy drives (i.e., passively drives) the elastomeric active layer 408 back to its normal and quiescent ON position. In addition, a second force operates when an electrical potential difference ($\Delta V_2$) is applied across the third and fourth conductors 902, 904 to electrically drive the active layer 408 back to its quiescent ON position. Thus, both the potential energy stored in the elastomerically deformed active layer 408 and the force due to Coulomb attraction generated by an applied electrical potential difference across the third and fourth conductors 902, 904 drive the elastomeric active layer 408 back to its quiescent ON position depicted in FIG. 9A.

In another aspect, FIGS. 9A and 9B illustrate the use of optical microstructures as standoffs 412, as previously described with reference to FIG. 8. The plurality of standoffs 412 are distributed within the outer region 602 of the pixel 900 (i.e., perimeter of the pixel) and the optical microstructures 410 are disposed in the center region 600. As depicted, the small standoffs 412 have the same size and shape as the optical microstructures 410. To minimize light leakage at the perimeter of the pixel, an absorbing layer 462 which extends over the optical microstructures located in the outer region 602 of the pixel is introduced into the pixel architecture. The absorbing layer 462 may be disposed within the electronics layer 430 and positioned vertically in-line and centered above the standoff structures 412 and transparent spacer 432, as previously described with respect to FIG. 4F. Thus, an emitted light ray 916 that travels through the spacer structure 432 may be captured and extinguished by the absorbing layer 462, as illustrated by the path of emitted light ray 916.

Figure 10A:
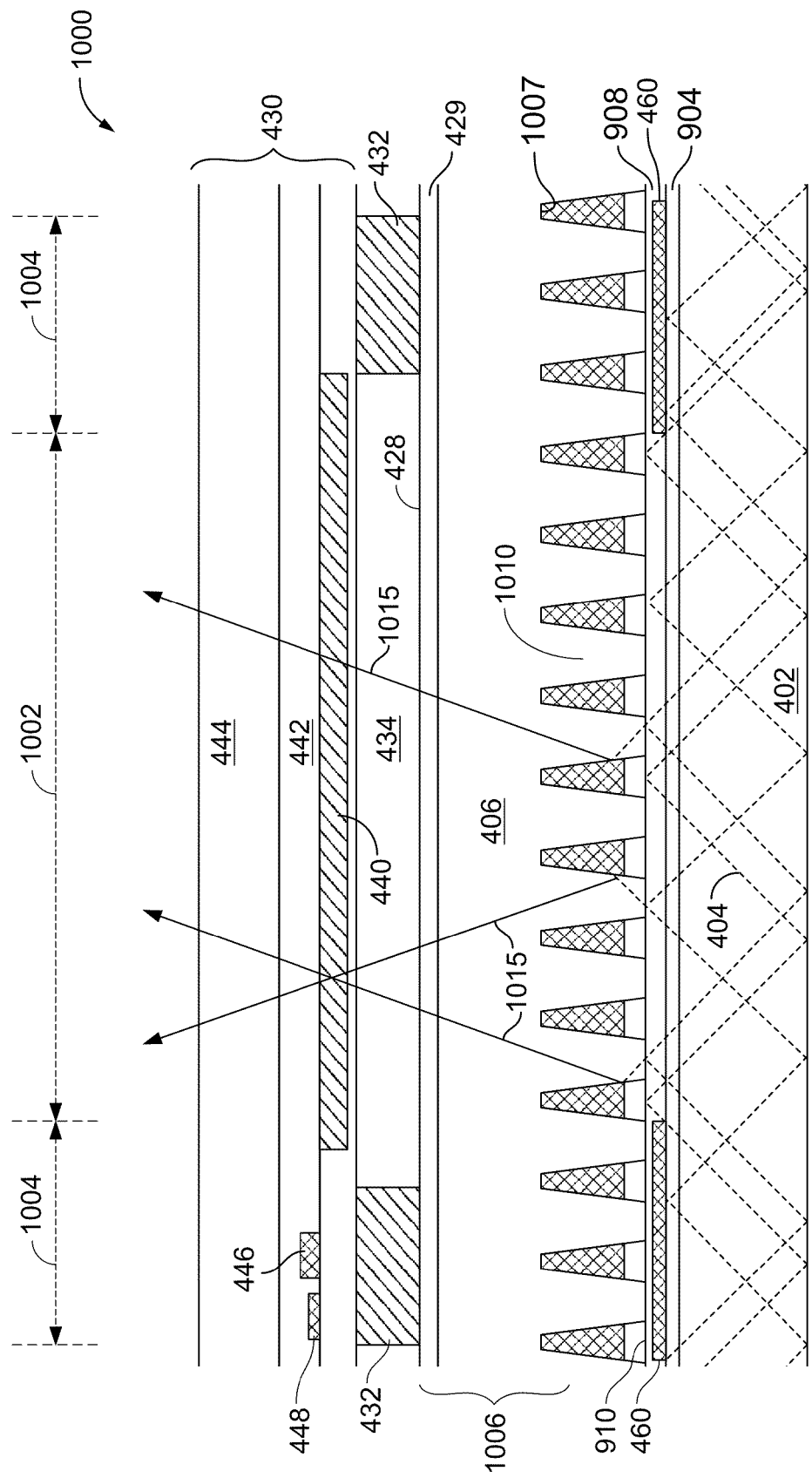
FIG. 10A and FIG. 10B conceptually illustrate a third exemplary embodiment of a pixel in the quiescent ON state and the actuated OFF state, respectively.
Figure 10B:
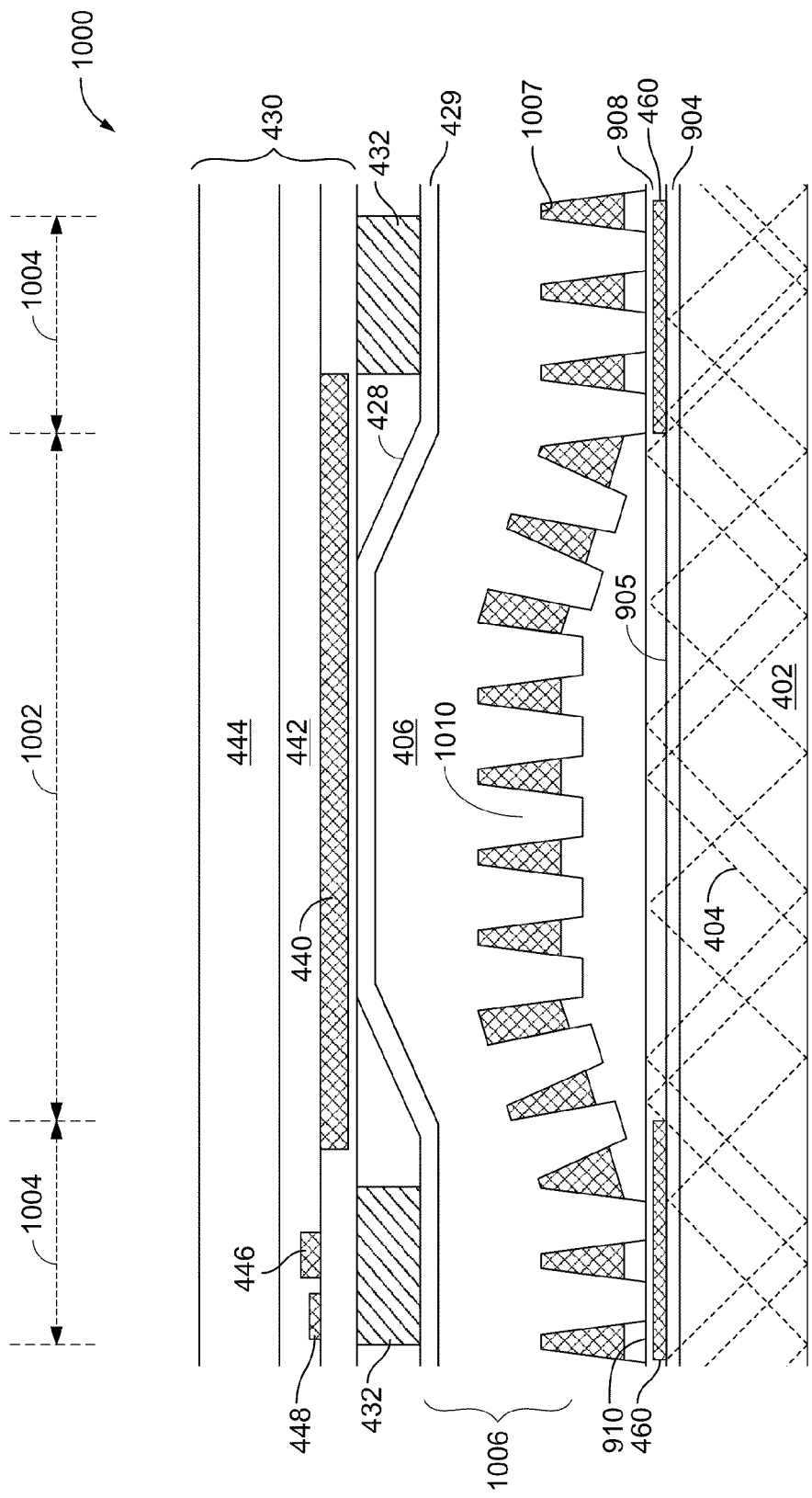
Figure 11:
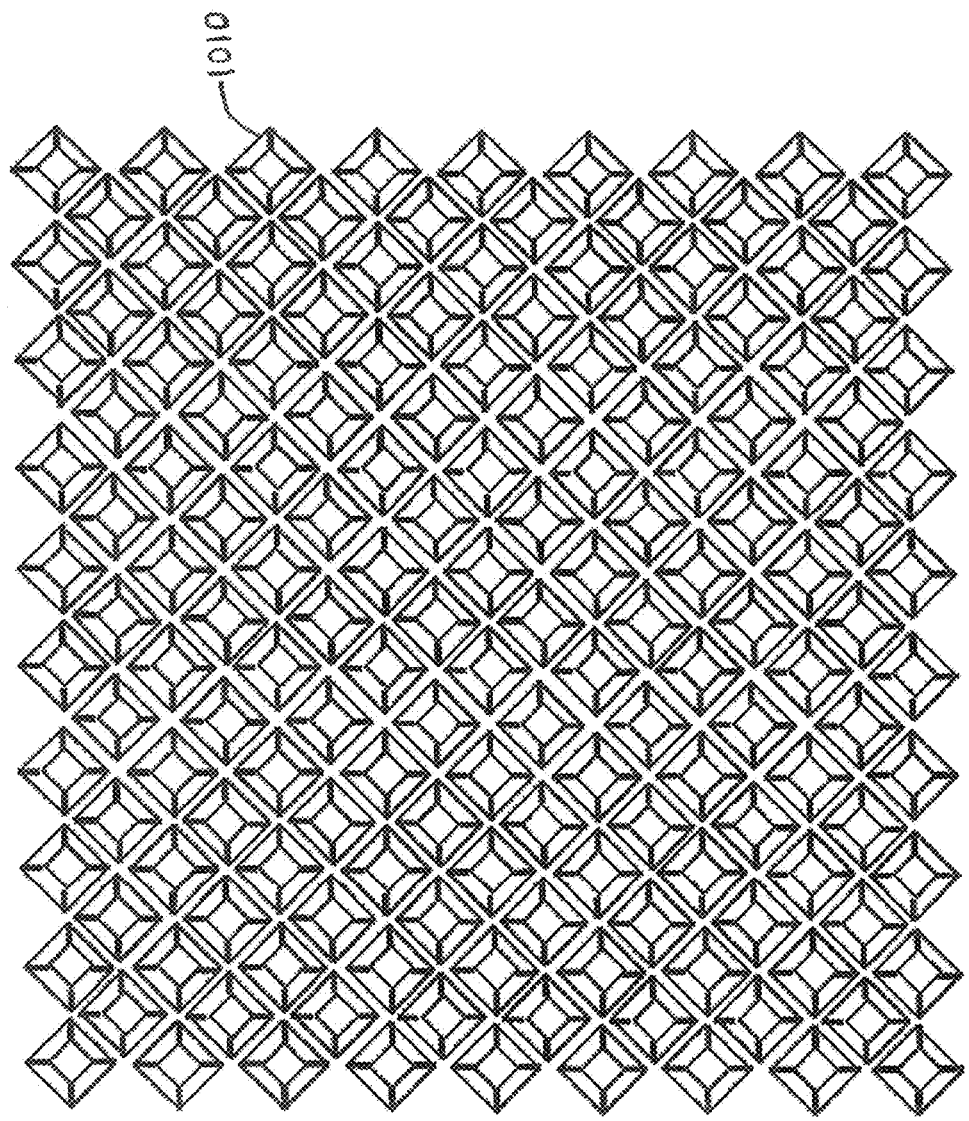
FIG. 11 depicts a top view of a lower surface of an active layer to conceptually illustrate another exemplary distribution of optical microstructures for a single pixel, in accordance with the embodiment depicted in FIGS. 10A and 10B.

FIG. 10A and FIG. 10B conceptually illustrate a third exemplary embodiment of a pixel in the quiescent ON state and the actuated OFF state, respectively. In this embodiment, the pixel 1000 comprises an active layer 1006 with a uniform distribution of optical microstructures 1010 along a lower surface 1007 of the active layer 1006. FIG. 11 depicts a top view of a lower surface of the active layer 1006 depicted in FIG. 10A and FIG. 10B.

In contrast to the previously described embodiments, this embodiment does not have the mid-region with an absence of optical microstructures along the lower surface 1007 of the active layer 1006 to insure that light is not undesirably coupled out of the waveguide 402 when the pixel 1000 is actuated to an OFF position, as previously described above. Thus, as depicted in FIG. 10B, when the pixel 1000 is actuated to an OFF position the optical microstructures 1010 within a central region 1002 of the active layer 1006 are of sufficient distance (a constant distance) from the top surface 910 of the dielectric layer 908 to eliminate the coupling of TIR light 404 out of the waveguide 402 via FTIR.

However, in order to extinguish any light that could undesirably couple out of optical microstructures 1010 located in an exterior region 1004, having smaller varying distances from the top surface 910 of the dielectric layer 908, a cladding layer 460 (as described with reference to FIG. 4E) which extends under the optical microstructures 1010 located in the exterior region 1004 is introduced into the pixel architecture. As illustrated, the cladding layer 460 is disposed on a top surface 905 of the fourth conductor 904 and situated below the optical microstructures 1010 deployed as standoffs at the perimeter of the pixel in order to prevent light 404 from entering these optical microstructures 1010. The cladding layer 460 may comprise essentially any low or negative refractive index material capable of preventing light rays 404 that strike it from exiting the waveguide 402.

In all embodiments discussed herein, anti-stiction means (not shown), such as fluorine-based components, may be coated onto the bottom surface of the active layer or otherwise incorporated into the active layer, and/or coated onto the top surface of the waveguide or otherwise incorporated into the top surface layer of the waveguide, in order to overcome van der Waals forces, tribocharging effects, and other forces that may be present at the active layer/waveguide interface that would conspire to prevent the active layer from being pulled off of the waveguide to turn the pixel OFF.

Figure 12:
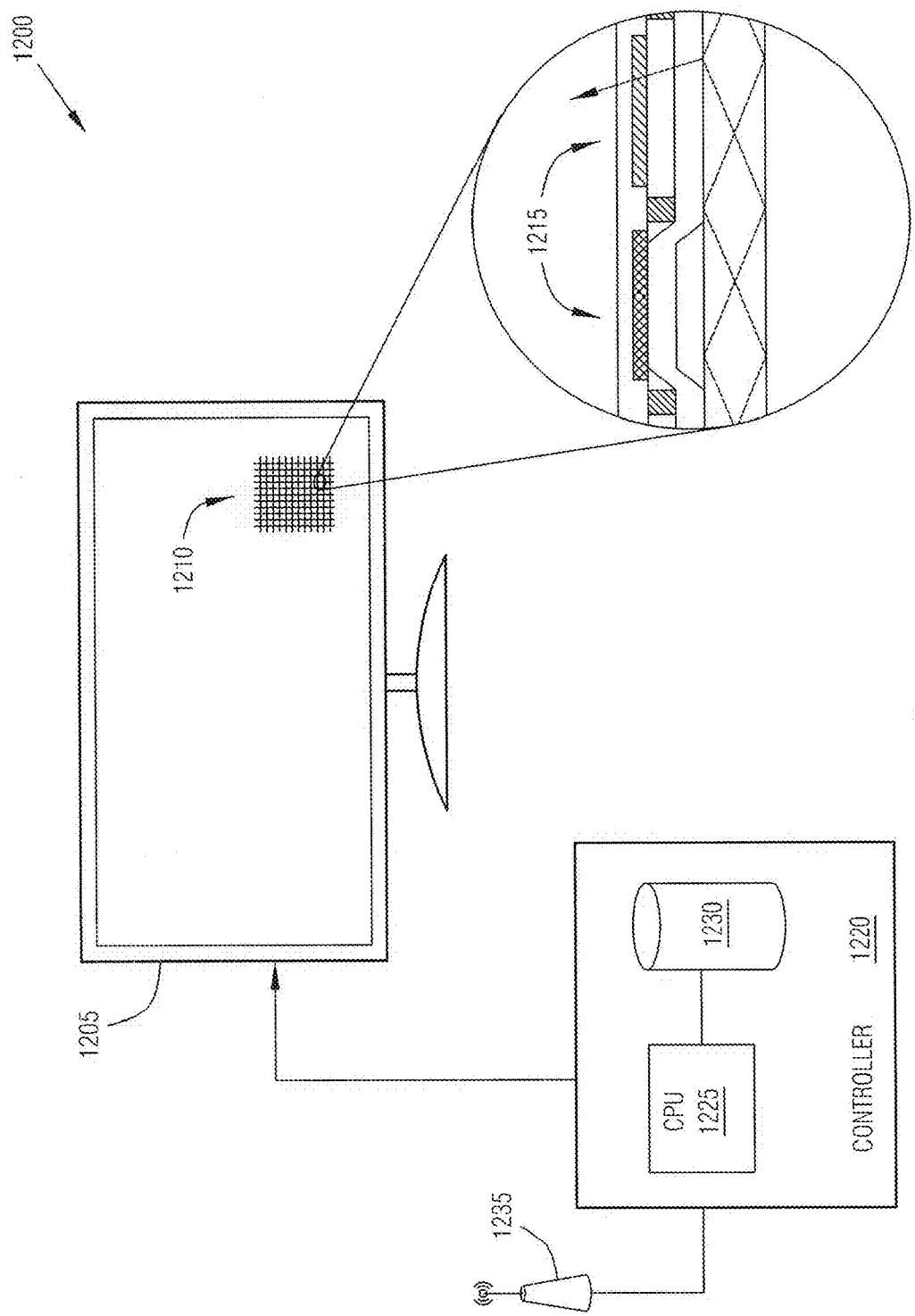
FIG. 12 conceptually illustrates a frustrated total internal reflection ("FTIR") display system.

FIG. 12 conceptually illustrates a frustrated total internal reflection ("FTIR") display system 1200. In the illustrated embodiment, the system 1200 includes a display 1205 that utilizes an array 1210 of pixels 1215 that implement one or more of the inverted pixel architecture embodiments described herein. Each pixel 1215 includes an active layer that is in contact (or nearly in contact) with a slab waveguide so that total internal reflection of light traveling within the slab waveguide is frustrated and the light is able to escape through the pixel 1215 when the pixel is in the quiescent state, as discussed herein.

In the illustrated embodiment, the display 1205 is communicatively coupled to a controller 1220 that provides signals to actuate the pixels 1215 and/or to allow the pixels 1215 to return to the quiescent state. Techniques for generating these signals and providing them to pixel locations within the display 1205 are known in the art. In the interest of clarity, only those aspects of generating control signals and providing them to pixel locations that are relevant to the subject matter described in this application will be discussed herein.

In one embodiment, the controller 1220 includes a central processing unit ("CPU") 1225 that can access information stored in a data storage element 1230. The data storage element 1230 may comprise, for example, a data structure (not shown) encoded on a computer-readable storage medium. The storage medium may be optical or magnetic. Exemplary data storage elements 1230 may include internal hard disk drives, external hard disk drives, compact disks, digital video disks, digital tape, and the like.

The CPU 1225 can use this information to control the pixel array 1210 in the display 1205. For example, the CPU 1225 may use information encoded on a digital video disk to generate and provide control signals to turn on and/or turn off the pixels 1215 in the display 1205 (as well as the appropriate light sources and/or other electronics) so that the images represented by the information included on the digital video disk appear on the display 1205. The controller 1220 may also receive signals from external sources, such as the antenna 1235 FIG. 12. The signals may also be used to generate and provide control signals to the display 1205.

Power consumption by the display 1205 may be significantly reduced relative to conventional displays by implementing the inverted pixel architecture described herein. One reason for the reduced power consumption is that the inverted pixels can operate at lower voltages. The voltage required to displace the active layer is approximately proportional to the square of the distance between the conductive plates of the pixel capacitor. For the conventional architecture, the distance between the conductive plates in the pixel can be 2 μm or more, whereas embodiments of the inverted architecture can use a distance between conductors of approximately 600 nm or less. Consequently, the voltages used in the conventional displays can be at least nine times larger than the voltages used by the display 1205 implementing the inverted pixel architecture. Another reason for the reduced power consumption is that the electrical fields (and resulting electrostatic force) in the inverted pixel can be larger than the corresponding fields in the conventional pixel architectures (for the same applied voltage) because there is a smaller gap between the "capacitor" plates of the pixel having an inverted architecture as compared to the "capacitor" plates (i.e., conductive layers) used to actuate a pixel in the conventional pixel architecture.

This concludes the detailed description. The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
   a slab waveguide exhibiting total internal reflection of injected light;
   a pixel adjacent a surface of the slab waveguide, the pixel comprising:
   an active layer disposed adjacent the surface of the slab waveguide, wherein the active layer is configured to frustrate the total internal reflection of the injected light when the active layer is within a first selected distance from the surface of the waveguide, thereby allowing a portion of the injected light to exit the slab waveguide through the pixel in an "ON state"; and
   a driver electronics layer disposed adjacent the active layer and opposite the slab waveguide, wherein the driver electronics layer is configured to apply an electrical potential difference that propels the active layer away from the surface of the slab waveguide a distance exceeding the first selected distance to drive the pixel into an "OFF state".

2. The apparatus of claim 1, wherein the pixel comprises at least one standoff between the active layer and the slab waveguide to define a perimeter of the pixel.

3. The apparatus of claim 2, wherein the active layer is separated from the slab waveguide by a space defined by the distance when the driver electronics layer applies the voltage, and wherein the space is large enough to inhibit transmission of light from the slab waveguide into the active layer.

4. The apparatus of claim 2, wherein a portion of the active layer within the perimeter of the pixel is separated from the slab waveguide by less than the first selected distance when no voltage is applied by the driver electronics layer, the first selected distance being small enough to frustrate total internal reflection at the surface of the slab waveguide and allow the injected light to exit the slab waveguide from a region within the perimeter of the pixel.

5. The apparatus of claim 2, further comprising at least one reflective layer formed within or on the active layer in line with said at least one standoff so that said at least one reflective layer can recycle light that exits the slab waveguide in a vicinity of the at least one standoff back into the slab waveguide.

6. The apparatus of claim 2, further comprising at least one low or negative refractive index cladding standoff formed in line with the at least one standoff so that said at least one low or negative refractive index cladding standoff can prevent light from exiting the slab waveguide in a vicinity of the at least one standoff.

7. The apparatus of claim 2, further comprising at least one low or negative refractive index cladding layer formed in line with the at least one standoff so that said at least one low or negative refractive index cladding layer can prevent light from exiting the slab waveguide in a vicinity of the at least one standoff.

8. The apparatus of claim 1, wherein the active layer includes a plurality of optical microstructures formed in a lower surface of the active layer so that the optical microstructures frustrate total internal reflection at the surface of the slab waveguide when the optical microstructures are within the first selected distance from the surface.

9. The apparatus of claim 1, wherein the driver electronics layer comprises:
   a first conductive layer disposed on an upper surface of the active layer;
   a second conductive layer disposed above the first conductive layer and separated from the first conductive layer by a second selected distance; and electronic elements configured to generate the applied voltage between the first and second conductive layers in response to a signal provided to the electronic elements.

10. A frustrated total internal reflection display, comprising:
   a slab waveguide exhibiting total internal reflection of injected light;
   a light source capable of injecting light into the slab waveguide;
   a plurality of pixels deployed adjacent a surface of the slab waveguide, each pixel comprising:
      an active layer that frustrates total internal reflection of the injected light at the surface when the active layer is within a first selected distance from the surface, thereby allowing a portion of the injected light to exit the slab waveguide through the pixel; and
      a driver electronics layer deployed adjacent the active layer and opposite the slab waveguide, wherein the driver electronics layer is configured to apply a voltage that propels the active layer away from the surface of the slab waveguide; and
   a controller configured to provide signals to the driver electronics layer such that operation of the pixels is coordinated to generate selected images by controllably frustrating total internal reflection from portions of the surface of the slab waveguide adjacent the pixels.

11. The frustrated total internal reflection display of claim 10, wherein each pixel comprises a plurality of standoffs deployed between the active layer and the slab waveguide to define a perimeter of the pixel.

12. The frustrated total internal reflection display of claim 11, wherein the standoffs separate the active layer from the slab waveguide by a space defined by a distance exceeding the first selected distance when the driver electronics layer applies the voltage, and wherein the space is large enough to inhibit transmission of light from the slab waveguide into the active layer.

13. The frustrated total internal reflection display of claim 12, wherein the controller can provide a variable signal to the driver electronics layer, and wherein the driver electronics layer can apply a variable voltage in response to the variable signal, and wherein the size of the gap in each pixel increases when a magnitude of the applied voltage increases.

14. The frustrated total internal reflection display of claim 11, wherein a portion of the active layer within the perimeter of each pixel is separated from the slab waveguide by less than the first selected distance when no voltage is applied to each pixel by the driver electronics layer, the first selected distance being small enough to frustrate total internal reflection at the surface of the slab waveguide and allow the injected light to exit the slab waveguide from a region within the perimeter of each pixel.

15. The frustrated total internal reflection display of claim 11, further comprising a reflective layer formed within or on the active layer in line with each standoff so that the reflective layer can recycle light that enters each standoff back into the slab waveguide.

16. The frustrated total internal reflection display of claim 11, further comprising at least one low or negative refractive index cladding standoff formed in line with the standoffs so that said at least one low or negative refractive index cladding standoff can prevent light from exiting the slab waveguide in a vicinity of the standoffs.

17. The frustrated total internal reflection display of claim 11, further comprising at least one low or negative refractive index cladding layer formed in line with the standoffs so that said at least one low or negative refractive index cladding layer can prevent light from exiting the slab waveguide in a vicinity of the standoffs.

18. The frustrated total internal reflection display of claim 11, wherein the portion of the active layer encompassed by the standoffs that define the perimeter of each pixel comprises a plurality of optical microstructures formed in a lower surface of the active layer so that the optical microstructures frustrate total internal reflection at the surface of the slab waveguide when the optical microstructures are within the first selected distance from the surface.

19. The frustrated total internal reflection display of claim 10, wherein the driver electronics layer of each pixel comprises:
   a first conductive layer disposed on an upper surface of a portion of the active layer in each pixel;
   a second conductive layer disposed above the first conductive layer and separated from the first conductive layer by a second selected distance; and
   electronic elements configured to generate the applied voltage between the first and second conductive layers in response to the signal provided by the controller.

20. An inverted pixel architecture for a frustrated total internal reflection display, comprising:
   a slab waveguide exhibiting total internal reflection of light injected into the slab waveguide;
   an active layer capable of selectively frustrating the total internal reflection of the injected light in the slab waveguide; and
   a driver electronics layer capable of driving the active layer between a quiescent ON state and a non-quiescent OFF state.

21. The inverted pixel architecture of claim 20, wherein:
   the active layer frustrates the total internal reflection of the injected light when within a first selected distance from the slab waveguide to allow a portion of the injected light to exit the slab waveguide through a pixel in an ON state; and
   the driver electronics layer applies a voltage propelling the active layer away from the slab waveguide a distance exceeding the first selected distance to drive the pixel into the non-quiescent OFF state.

22. The inverted pixel architecture of claim 21, wherein a plurality of standoffs are deployed between the active layer and the slab waveguide, and the active layer includes at least one reflective layer in line with each standoff so that the reflective layer can selectively recycle light that enters each standoff back into the slab waveguide.

23. The inverted pixel architecture of claim 21, further comprising a plurality of standoffs deployed between the active layer and the slab waveguide, and at least one low or negative refractive index cladding standoff formed in line with at least one of the standoffs so that said at least one low or negative refractive index cladding standoff can prevent light from exiting the slab waveguide in a vicinity of the at least one of the standoffs.

24. The inverted pixel architecture of claim 21, further comprising a plurality of standoffs deployed between the active layer and the slab waveguide, and at least one low or negative refractive index cladding layer formed in line with at least one of the standoffs so that said at least one low or negative refractive index cladding layer can prevent light from exiting the slab waveguide in a vicinity of the at least one of the standoffs.

25. The inverted pixel architecture of claim 21, wherein the active layer includes a plurality of optical microstructures formed in a first surface thereof, the first surface facing the slab waveguide, so that the optical microstructures frustrate total internal reflection of the slab waveguide when within the first selected distance.

26. The inverted pixel architecture of claim 21 wherein the driver electronics layer comprises:
- a first conductive layer disposed on an upper surface of the active layer;
- a second conductive layer disposed above the first conductive layer and separated from the first conductive layer by a second selected distance; and
- a plurality of electronic elements configured to generate the applied voltage between the first and second conductive layers in response to a signal provided to the electronic elements.

27. A method for use in operating a frustrated total internal reflection display, comprising driving an inverted pixel architecture between a quiescent ON state and a non-quiescent OFF state, wherein the inverted pixel architecture comprises:
- a slab waveguide;
- an active layer; and
- a driver electronics layer.

28. The method of claim 27 wherein:
- the slab waveguide exhibits total internal reflection of light injected into the slab waveguide;
- the active layer is capable of selectively frustrating the total internal reflection of the injected light in the slab waveguide;
- the driver electronics layer is capable of driving the active layer between the quiescent ON state and the non-quiescent OFF state; and
- driving the inverted pixel architecture between the quiescent ON state and the non-quiescent OFF state includes applying a voltage propelling the active layer away from the slab waveguide a distance exceeding a first selected distance to drive a pixel from the quiescent ON state in which the active layer frustrates the total internal reflection of the injected light to allow a portion of the injected light to exit the slab waveguide into the non-quiescent OFF state.

* * * * *